US011121926B2

(12) United States Patent
Ohmachi et al.

(10) Patent No.: US 11,121,926 B2
(45) Date of Patent: Sep. 14, 2021

(54) MANAGEMENT APPARATUS OF MANAGING DEVICES USING HISTORY OF COMMUNICATION PROCESSES, MANAGEMENT SYSTEM OF MANAGING DEVICES USING HISTORY OF COMMUNICATION PROCESSES, AND MANAGEMENT METHOD OF MANAGING DEVICES USING HISTORY OF COMMUNICATION PROCESSES

(71) Applicant: FUJITSU LIMITED, Kawasaki (JP)

(72) Inventors: Keiichi Ohmachi, Setagaya (JP); Takayuki Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/100,995

(22) Filed: Nov. 23, 2020

(65) Prior Publication Data

US 2021/0234758 A1    Jul. 29, 2021

(30) Foreign Application Priority Data

Jan. 29, 2020 (JP) .............................. JP2020-012223

(51) Int. Cl.
*H04L 12/24* (2006.01)
*H04L 12/26* (2006.01)

(52) U.S. Cl.
CPC .......... *H04L 41/0893* (2013.01); *H04L 41/22* (2013.01); *H04L 43/065* (2013.01)

(58) Field of Classification Search
None
See application file for complete search history.

(56) References Cited

U.S. PATENT DOCUMENTS

| 2004/0177066 | A1* | 9/2004 | Igarashi | H04L 41/12 |
| 2013/0179600 | A1 | 7/2013 | Fujii | |
| 2014/0289847 | A1* | 9/2014 | Hughes | H04L 43/026 726/22 |
| 2019/0286491 | A1* | 9/2019 | Bohacek | G06F 9/5061 |
| 2019/0342321 | A1* | 11/2019 | Sartran | H04L 43/04 |
| 2020/0252416 | A1* | 8/2020 | Niv | H04L 43/062 |

FOREIGN PATENT DOCUMENTS

| JP | H09-069083 A | 3/1997 |
| JP | 2011-055231 A | 3/2011 |
| JP | 2013-141185 A | 7/2013 |

\* cited by examiner

*Primary Examiner* — Joshua Joo
(74) *Attorney, Agent, or Firm* — Fujitsu Patent Center

(57) ABSTRACT

A management apparatus includes a memory and a processor coupled to the memory. The processor is configured to execute a grouping process that includes a collection process which collect information from each of a plurality of devices based on a history of communication processes executed with another device of the plurality of devices and store the information in the memory, execute a creation process which create a group by correctively combining one or more pairs of communication source and communication destination devices in which communication processes of a same type were executed at a same time interval based on the information collected in the collection process and output display information for displaying information of the devices included in the group created by the grouping process.

8 Claims, 28 Drawing Sheets

| IP ADDRESS | SERIAL NUMBER | OS CLASSIFICATION TYPE | LOGIN ID | PASSWORD |
|---|---|---|---|---|
| 10.1.1.1 | AAA | OS1 | administrator | xxx |
| 10.1.1.2 | BBB | OS2 | root | yyy |
| 10.1.1.3 | CCC | OS3 | root | zzz |
| ... | ... | ... | ... | ... |

| TIMESTAMP: 20191212 | | | |
|---|---|---|---|
| COMMUNICATION SOURCE ADDRESS | COMMUNICATION DESTINATION ADDRESS | PROCESS NAME | EXECUTION INTERVAL |
| 1.1.1.1 | 5.5.5.5 | ftp.exe | 1 DAY |
| 1.1.1.1 | 6.6.6.6 | ftp.exe | 1 DAY |
| 1.1.1.1 | 7.7.7.7 | ftp.exe | 1 DAY |
| 2.2.2.2 | 3.3.3.3 | ftp.exe | 60 MINUTES |
| 2.2.2.2 | 4.4.4.4 | ftp.exe | 60 MINUTES |
| 7.7.7.7 | 8.8.8.8 | httpd.exe | 5 SECONDS |
| 7.7.7.7 | 9.9.9.9 | httpd.exe | 5 SECONDS |
| ... | ... | ... | ... |

| | COMMUNICATION SOURCE ADDRESS | COMMUNICATION DESTINATION ADDRESS | PROCESS NAME | EXECUTION INTERVAL | REPRESENTATIVE ADDRESS | DATE | MAIN IDENTIFIER |
|---|---|---|---|---|---|---|---|
| | ... | ... | ... | ... | ... | ... | ... |
| R1 | 1.1.1.1 | 5.5.5.5 | ftp.exe | 1 DAY | 1.1.1.1 | 20191212 | - |
| R2 | 1.1.1.1 | 6.6.6.6 | ftp.exe | 1 DAY | 1.1.1.1 | 20191212 | - |
| R3 | 1.1.1.1 | 7.7.7.7 | ftp.exe | 1 DAY | 1.1.1.1 | 20191212 | - |
| R4 | 2.2.2.2 | 3.3.3.3 | ftp.exe | 60 MINUTES | 2.2.2.2 | 20191212 | - |
| R5 | 2.2.2.2 | 4.4.4.4 | ftp.exe | 60 MINUTES | 2.2.2.2 | 20191212 | - |
| R6 | 7.7.7.7 | 8.8.8.8 | httpd.exe | 5 SECONDS | 7.7.7.7 | 20191212 | - |
| R7 | 7.7.7.7 | 9.9.9.9 | httpd.exe | 5 SECONDS | 7.7.7.7 | 20191212 | - |
| | ... | ... | ... | ... | ... | ... | ... |

Groups: {R1, R2, R3}, {R4, R5}, {R6, R7}

FIG. 15

| | COMMUNICATION SOURCE ADDRESS | COMMUNICATION DESTINATION ADDRESS | PROCESS NAME | EXECUTION INTERVAL | REPRESENTATIVE ADDRESS | DATE | MAIN IDENTIFIER |
|---|---|---|---|---|---|---|---|
| | ... | ... | ... | ... | ... | ... | ... |
| R11 | 1.1.1.1 | 5.5.5.5 | ftpd.exe | 1 DAY | 1.1.1.1 | 20190505 | - |
| R12 | 1.1.1.1 | 6.6.6.6 | ftpd.exe | 1 DAY | 1.1.1.1 | 20190505 | - |
| R13 | 1.1.1.1 | 7.7.7.7 | ftpd.exe | 1 DAY | 1.1.1.1 | 20190505 | - |
| R14 | 5.5.5.5 | 1.1.1.1 | ftp.exe | 1 DAY | 1.1.1.1 | 20190505 | - |
| R15 | 6.6.6.6 | 1.1.1.1 | ftp.exe | 1 DAY | 1.1.1.1 | 20190505 | - |
| R16 | 7.7.7.7 | 1.1.1.1 | ftp.exe | 1 DAY | 1.1.1.1 | 20190505 | - |
| | ... | ... | ... | ... | ... | ... | ... |

161

GROUP

FIG. 21

GROUP TABLE 171a

| COMMUNICATION SOURCE ADDRESS | COMMUNICATION DESTINATION ADDRESS | PROCESS NAME | EXECUTION INTERVAL | REPRESENTATIVE ADDRESS | DATE | DIFFERENCE |
|---|---|---|---|---|---|---|
| 1.1.1.1 | 5.5.5.5 | ftp.exe | 1 DAY | 1.1.1.1 | 20191212 | |
| 1.1.1.1 | 6.6.6.6 | ftp.exe | 1 DAY | 1.1.1.1 | 20191212 | |
| 1.1.1.1 | 7.7.7.7 | ftp.exe | 1 DAY | 1.1.1.1 | 20191212 | |

ASSET TABLE 172a

| IP ADDRESS | SERIAL NUMBER | OS CLASSIFICATION TYPE | LOGIN ID | PASSWORD |
|---|---|---|---|---|
| 1.1.1.1 | AAAA | OS1 | administrator | wwww |
| 5.5.5.5 | BBBB | OS2 | root | xxxx |
| 6.6.6.6 | CCCC | OS2 | root | yyyy |
| 7.7.7.7 | DDDD | OS2 | root | zzzz |

FIG. 22

GROUP TABLE (171b)

| COMMUNICATION SOURCE ADDRESS | COMMUNICATION DESTINATION ADDRESS | PROCESS NAME | EXECUTION INTERVAL | REPRESENTATIVE ADDRESS | DATE | DIFFERENCE |
|---|---|---|---|---|---|---|
| 1.1.1.1 | 5.5.5.5 | ftp.exe | 1 DAY | 1.1.1.1 | 20191212 | |
| 1.1.1.1 | 6.6.6.6 | ftp.exe | 1 DAY | 1.1.1.1 | 20191212 | |
| 1.1.1.1 | 7.7.7.7 | ftp.exe | 1 DAY | 1.1.1.1 | 20191212 | |
| 1.1.1.1 | 8.8.8.8 | ftp.exe | 1 DAY | 1.1.1.1 | 20191212 | ADDED |

R21

ASSET TABLE (172b)

| IP ADDRESS | SERIAL NUMBER | OS CLASSIFICATION TYPE | LOGIN ID | PASSWORD |
|---|---|---|---|---|
| 1.1.1.1 | AAAA | OS1 | administrator | wwww |
| 5.5.5.5 | BBBB | OS2 | root | xxxx |
| 6.6.6.6 | CCCC | OS2 | root | yyyy |
| 7.7.7.7 | DDDD | OS2 | root | zzzz |
| 8.8.8.8 | EEEE | OS2 | root | vvvv |

FIG. 23

GROUP TABLE 171c

| COMMUNICATION SOURCE ADDRESS | COMMUNICATION DESTINATION ADDRESS | PROCESS NAME | EXECUTION INTERVAL | REPRESENTATIVE ADDRESS | DATE | DIFFERENCE |
|---|---|---|---|---|---|---|
| 1.1.1.1 | 5.5.5.5 | ftp.exe | 1 DAY | 1.1.1.1 | 20191212 | |
| 1.1.1.1 | 6.6.6.6 | ftp.exe | 1 DAY | 1.1.1.1 | 20191212 | |
| 1.1.1.1 | 7.7.7.7 | ftp.exe | 1 DAY | 1.1.1.1 | 20191211 | DELETED |

R22

ASSET TABLE 172c

| IP ADDRESS | SERIAL NUMBER | OS CLASSIFICATION TYPE | LOGIN ID | PASSWORD |
|---|---|---|---|---|
| 1.1.1.1 | AAAA | OS1 | administrator | wwww |
| 5.5.5.5 | BBBB | OS2 | root | xxxx |
| 6.6.6.6 | CCCC | OS2 | root | yyyy |
| 7.7.7.7 | DDDD | OS2 | root | zzzz |

FIG. 24

GROUP TABLE

| COMMUNICATION SOURCE ADDRESS | COMMUNICATION DESTINATION ADDRESS | PROCESS NAME | EXECUTION INTERVAL | REPRESENTATIVE ADDRESS | DATE | DIFFERENCE |
|---|---|---|---|---|---|---|
| 1.1.1.1 | 5.5.5.5 | ftp.exe | 1 DAY | 1.1.1.1 | 20191211 | |
| 1.1.1.1 | 6.6.6.6 | ftp.exe | 1 DAY | 1.1.1.1 | 20191211 | |
| 1.1.1.1 | 7.7.7.7 | ftp.exe | 1 DAY | 1.1.1.1 | 20191211 | DELETED |
| 1.1.1.1 | 7.7.7.7 | sftp.exe | 1 DAY | 1.1.1.1 | 20191212 | |

171d1 → (rows 1-2)
171d2 → (row 3, dashed)
R23 → (row 3)

ASSET TABLE  172d

| IP ADDRESS | SERIAL NUMBER | OS CLASSIFICATION TYPE | LOGIN ID | PASSWORD |
|---|---|---|---|---|
| 1.1.1.1 | AAAA | OS1 | administrator | wwww |
| 5.5.5.5 | BBBB | OS2 | root | xxxx |
| 6.6.6.6 | CCCC | OS2 | root | yyyy |
| 7.7.7.7 | DDDD | OS2 | root | zzzz |

FIG. 27
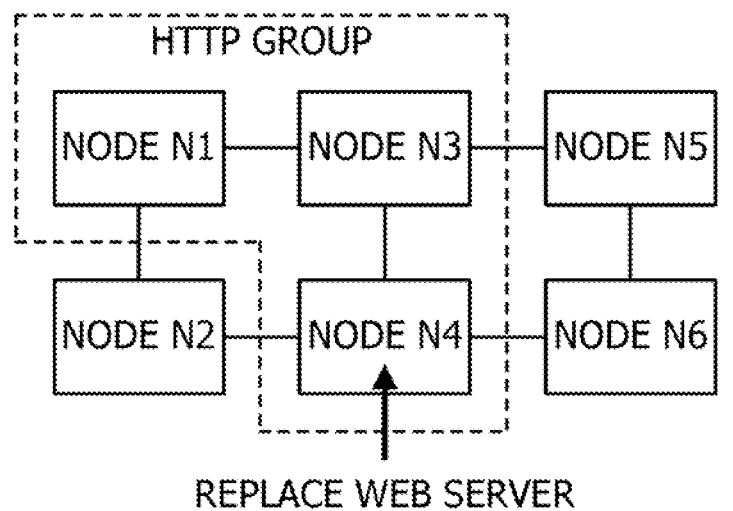
REPLACE WEB SERVER
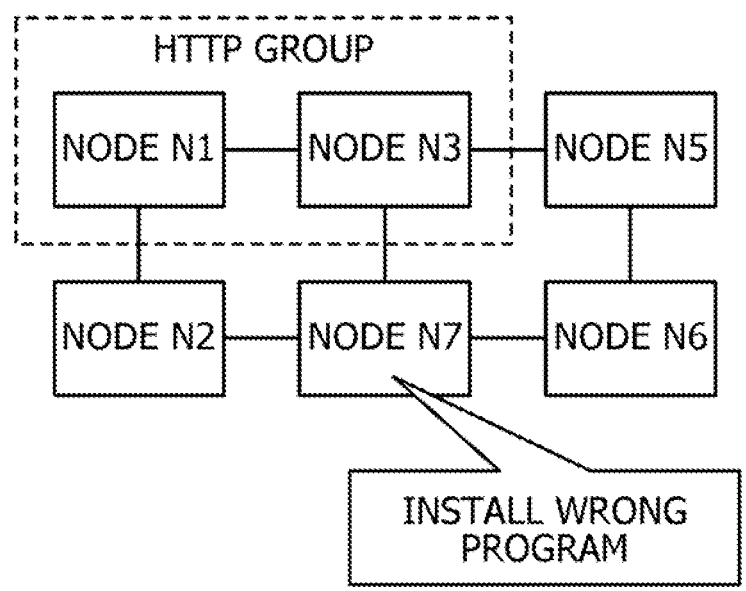
INSTALL WRONG PROGRAM

FIG. 28
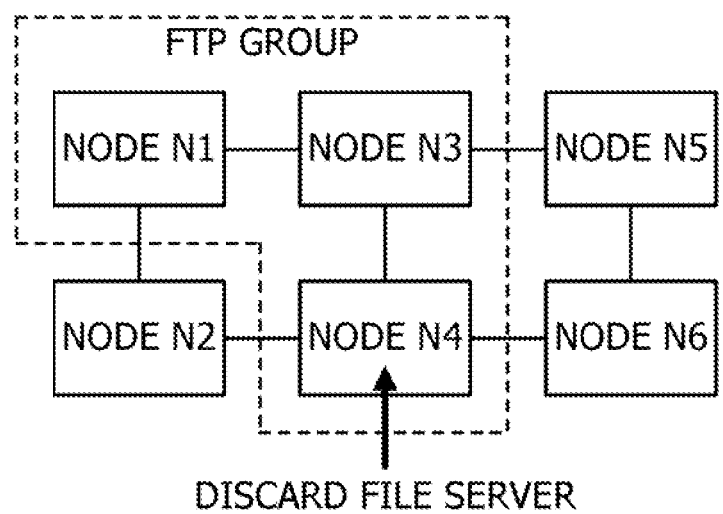
DISCARD FILE SERVER
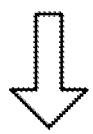
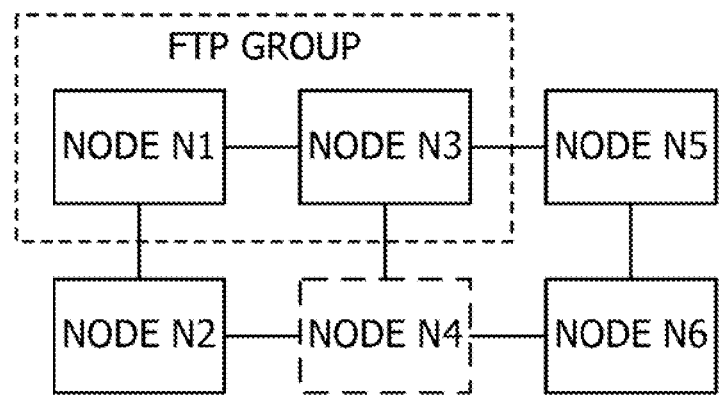

MANAGEMENT APPARATUS OF MANAGING DEVICES USING HISTORY OF COMMUNICATION PROCESSES, MANAGEMENT SYSTEM OF MANAGING DEVICES USING HISTORY OF COMMUNICATION PROCESSES, AND MANAGEMENT METHOD OF MANAGING DEVICES USING HISTORY OF COMMUNICATION PROCESSES

CROSS-REFERENCE TO RELATED APPLICATION

This application is based upon and claims the benefit of priority of the prior Japanese Patent Application No. 2020-12223, filed on Jan. 29, 2020, the entire contents of which are incorporated herein by reference.

FIELD

The embodiments discussed here are related to a management apparatus, a management system, and a management method.

BACKGROUND

The maintenance work of the computer system includes, for example, replacement, expansion, and disposal of a device, installation and uninstallation of a program, update, recovery of a device in which an abnormality has occurred, and the like. In recent years, large-scale computer systems including a large number of computers and communication devices, such as data centers, have been increasing, and the number of management target devices has been increasing accordingly. As the number of management target devices increases, the maintenance work becomes more complicated.

Japanese Laid-open Patent Publication Nos. 2011-55231 and 09-69083 are examples of related art.

SUMMARY

According to an aspect of the embodiments, a management apparatus includes: a memory; and a processor coupled to the memory and configured to: execute a grouping process that includes a collection process configured to collect information from each of a plurality of devices based on a history of communication processes executed with another device of the plurality of devices and store the information in the memory; execute a creation process configured to create a group by correctively combining one or more pairs of communication source and communication destination devices in which communication processes of a same type were executed at a same time interval based on the information collected in the collection process; and output display information for displaying information of the devices included in the group created by the grouping process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a management target device list stored in a device list storage unit;

FIG. 12 is a diagram illustrating an example of an analyzed data table stored in the node management apparatus;

FIG. 14 is a diagram illustrating a first example of information registered in a group data table;

FIG. 15 is a diagram illustrating a second example of information registered in a group data table;

FIG. 21 is a diagram illustrating a first display example of a group table and an asset table;

FIG. 22 is a diagram illustrating a second display example of a group table and an asset table;

FIG. 23 is a diagram illustrating a third display example of a group table and an asset table;

FIG. 24 is a diagram illustrating a fourth display example of group tables and an asset table;

FIG. 27 is diagram illustrating a second example of maintenance work; and

FIG. 28 is a diagram illustrating a third example of maintenance work.

DESCRIPTION OF EMBODIMENTS

The following proposals have been made for system management. For example, a network management system has been proposed in which a node analyzes the number of hops in network group information to select a group management apparatus dose to the self-node and form a group, thereby achieving hierarchical management of a network. A computer system has been proposed in which a manager mechanism is provided to integrate and manage configuration management information for network management and configuration management information for system management, so that device configuration information and program configuration information may be collectively managed.

When performing maintenance work on a device included in a computer system, it is important to specify another device that is estimated to be greatly affected by the maintenance work in order to improve the reliability of the maintenance work. For example, when performing maintenance work on a device, it may be better to stop not only the operation of the device to be subjected to the maintenance work but also the operation of another specified device. It may be better not only to perform the maintenance work on the target device but also to perform maintenance work on the other specified device. By stopping the operation of the other specified device or performing the maintenance work on the other device, it is possible to reduce the possibility that an abnormality will occur in the system after the maintenance work on the target device is performed.

However, as the number of management target devices increases and the system configuration and the process in the system become more complicated, it becomes more difficult to accurately specify a device that is estimated to be greatly affected by maintenance work.

In one aspect, a management apparatus, a management system, and a management method capable of presenting information for improving reliability of maintenance work may be provided.

Embodiments of the present disclosure are described below with reference to the drawings.

First Embodiment

Figure 1:
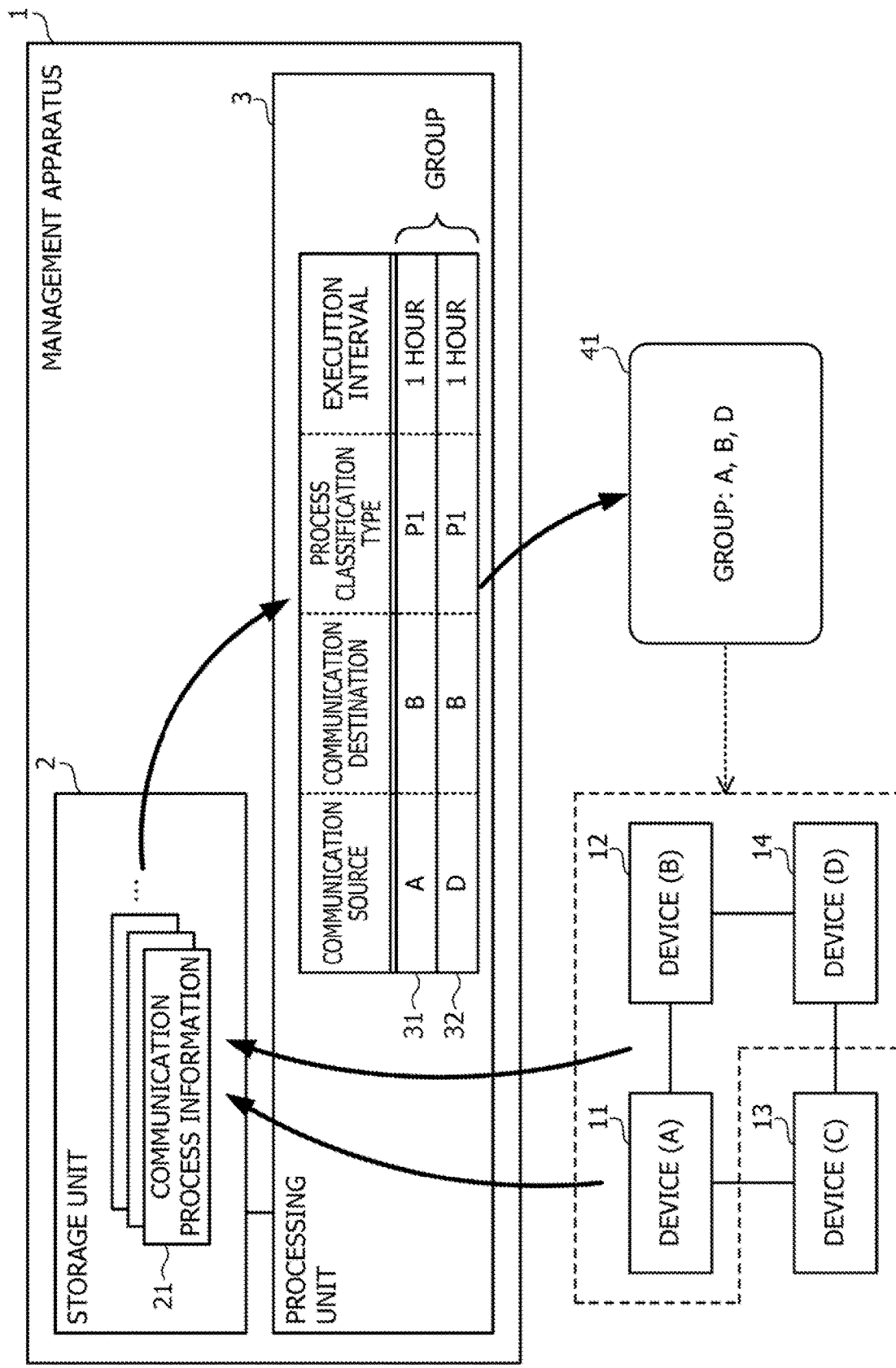
FIG. 1 is a diagram illustrating a configuration example and a process example of a management apparatus according to a first embodiment.

FIG. 1 is a diagram illustrating a configuration example and a process example of a management apparatus according to a first embodiment. A management apparatus 1 illustrated in FIG. 1 includes a storage unit 2 and a processing unit 3. The storage unit 2 is implemented, for example, as a storage area of a storage device (not illustrated) included in the management apparatus 1. The processing unit 3 is implemented, for example, as a processor (not illustrated) included in the data management apparatus 1.

The management apparatus 1 manages a plurality of devices. The plurality of devices to be managed are, for example, a computer such as a server device and a communication device such as a switch. One of the management target devices is capable of communicating with at least one other management target device. In FIG. 1, devices 11 to 14 are illustrated as the management target devices.

The processing unit 3 collects information from each of the devices 11 to 14 based on a history of communication processes executed with the other management target device, and stores the information in the storage unit 2. For example, based on the history of communication processes executed with the other device, each of the devices 11 to 14 creates communication process information 21 indicating the communication processes of the same type executed at the same time intervals with the same communication partner. The processing unit 3 collects the communication process information 21 from each of the devices 11 to 14 as information based on the history, and stores the information in the storage unit 2.

Based on the collected information (the communication process information 21 in FIG. 1), the processing unit 3 creates a group by collecting one or more pairs of communication source and communication destination devices in which the communication processes of the same type are executed at the same time intervals. For example, in FIG. 1, it is assumed that the following communication processes 31 and 32 are extracted based on the communication process information 21 stored in the storage unit 2.

The communication process 31 is a process in which a communication source is a device A (device 11), a communication destination is a device B (device 12), a process classification type is P1, and an execution interval is 1 hour. The communication process 32 is a process in which the communication source is a device D (device 14), the communication destination is the device B (device 12), the process classification type is P1, and the execution interval is 1 hour. Since the process classification types are the same between the communication processes 31 and 32, the process types are considered to be the same, and the execution intervals are also the same, so that the processing unit 3 groups the pair of devices A and B in the communication process 31 and the pair of devices D and B in the communication process 32.

The process classification type is information based on, for example, the name of a program and the name of a process to be executed, the name of a protocol to be used, and the like, and indicates the communication process type. For example, between the communication processes 31 and 32, not only when the process classification types are the same, but also when the process classification types are similar or related, it may be determined that the process types are the same.

In addition to the process type and the execution interval, for example, a used port number may be used to determine the grouping.

The processing unit 3 outputs display information 41 for displaying information of the devices A, B, and D included in the group created by the above process. The display information 41 is displayed on a display device (not illustrated) and viewed by the administrator.

According to the management apparatus 1 described above, it is possible to present information for improving the reliability of maintenance work. For example, since the devices A, B, and D included in the group perform the communication processes of the same type at the same time intervals, it is estimated that the devices A, B, and D are highly related to each other or highly dependent on each other. For example, when stopping the operation of any one of the devices A, B, and D, unless the operation of the other devices is also stopped, the possibility that an abnormality occurs in the other devices increases. When updating the program in any one of the devices A, B, and D, unless the programs are also updated in the other devices, the possibility that an abnormality occurs in the other devices increases.

Simply performing communication between a certain device and another device does not mean that the relevancy and dependency between these devices are high. By performing grouping based on the process classification type and the execution interval, the management apparatus 1 may estimate with high accuracy a group of devices having high relevancy and dependency, in which an abnormality is likely to occur unless some measures are taken during maintenance work.

Therefore, by viewing the display information 41, the administrator may determine that the influence of the maintenance work is likely to be large between the devices A, B, and D. For example, when stopping the operation of the device A, the administrator may determine that it is better to stop the operation of the devices B and D by viewing the display information 41. When updating the program of the device A, the administrator may determine that it is better to update the programs of the devices B and D by viewing the display information 41. By presenting the display information 41 to the administrator in this way, it is possible to improve the reliability of the maintenance work by the administrator.

Second Embodiment

Next, node management in a data center will be described as a second embodiment.

Figure 2:
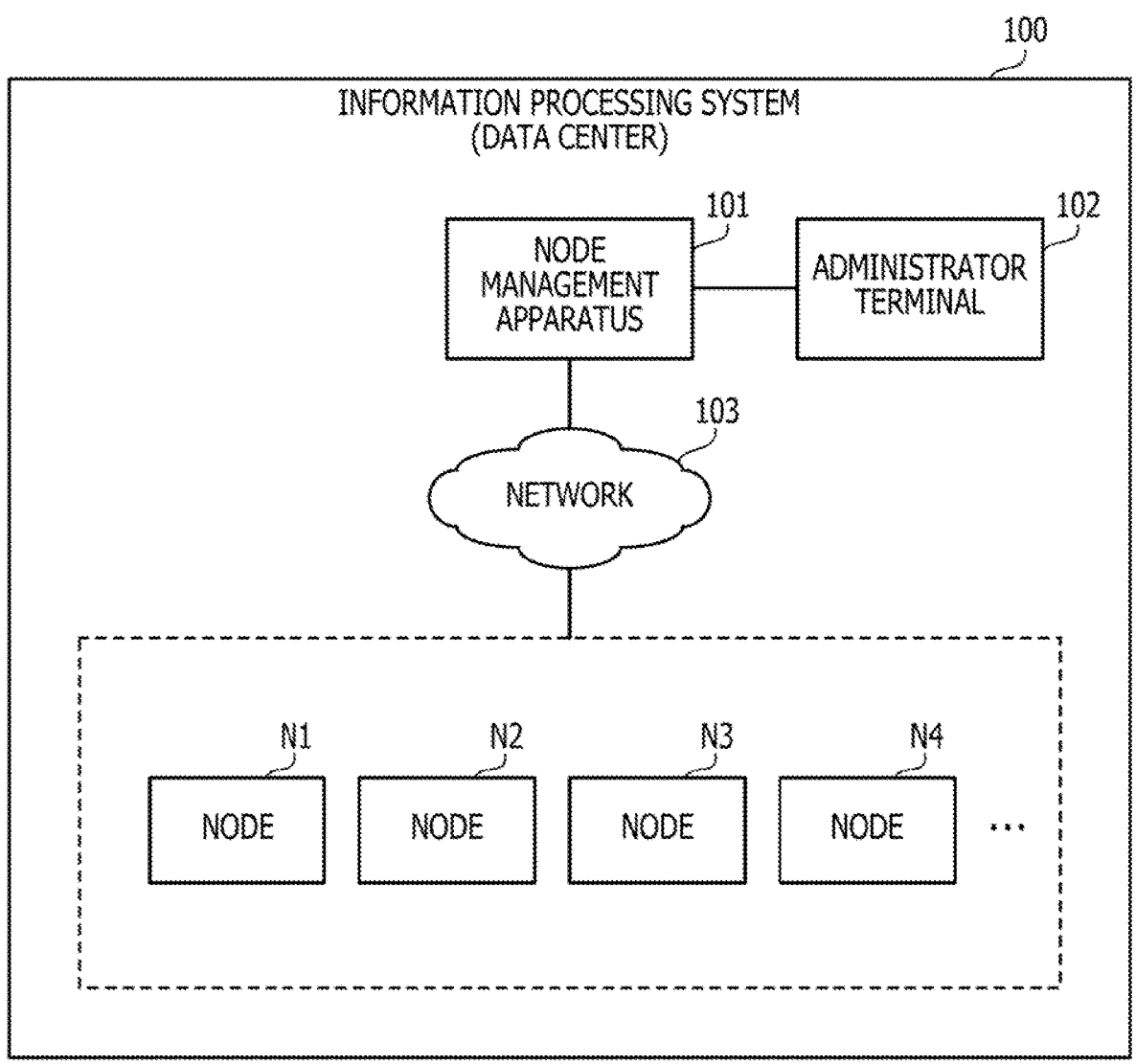
FIG. 2 is a diagram illustrating a configuration example of an information processing system according to a second embodiment.

FIG. 2 is a diagram illustrating a configuration example of an information processing system according to the second embodiment. An information processing system 100 illustrated in FIG. 2 is a system including various information processing devices arranged in a data center, and includes a node management apparatus 101, nodes N1, N2, N3, N4, . . . to be managed by the node management apparatus 101, and an administrator terminal 102 coupled to the node management apparatus 101.

The node management apparatus 101 manages the nodes N1, N2, N3, N4, . . . coupled via a network 103. The administrator terminal 102 is a terminal device operated by an administrator who manages the nodes N1, N2, N3, N4, . . . .

Each of the management target nodes N1, N2, N3, N4, . . . is an information processing device such as a server device or a communication device (network-related device). For example, as the server device, a Web server, an application server, a database server, a storage control server, or the like may be applied. As the communication device, a switch, a router, or the like may be applied. Each of the nodes N1, N2, N3, N4, . . . is coupled to at least one of the other management target nodes via a network.

The network 103 that couples the node management apparatus 101 and the nodes N1, N2, N3, N4, . . . may be the same as the network in which communication between the nodes is performed, or may be provided for management only, separate from such a network.

Each of the nodes N1, N2, N3, N4, . . . is provided with a function of collecting a history of executed communication processes and transmitting the history to the node management apparatus 101. The node management apparatus 101 visualizes the mutual relationship between the nodes based on the information collected from each node. For example, in the present embodiment, the node management apparatus 101 groups combinations of nodes that may be greatly affected during maintenance work based on a process name and a used port in communication, a communication destination, communication periodicity, and the like. The node management apparatus 101 displays group information together with node attribute information on the administrator terminal 102. When displaying the group information, the node management apparatus 101 may also indicate a difference between the configuration of a formed group and the configuration of a group formed in the past. By such a process, the management work by the administrator of the node is made efficient and accurate.

Figure 3:
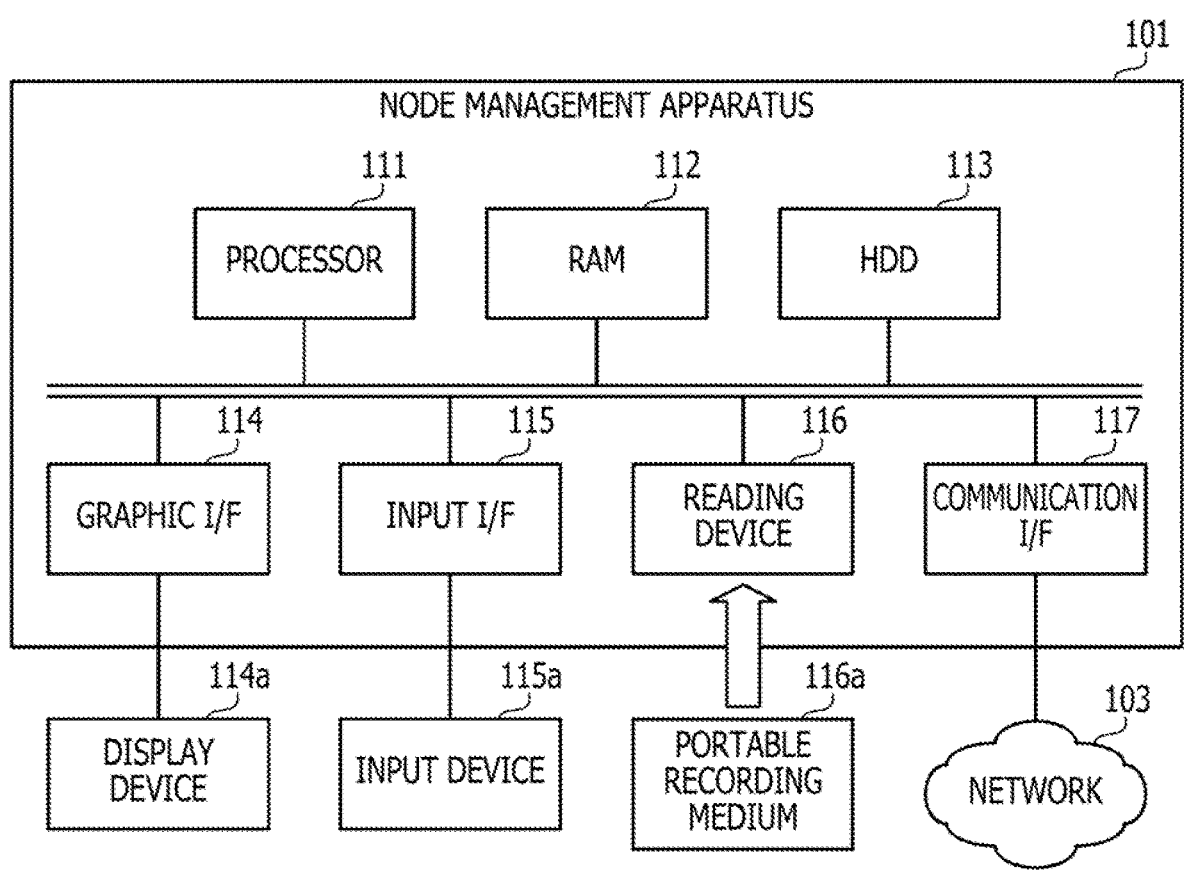
FIG. 3 is a diagram illustrating a hardware configuration example of a node management apparatus.

FIG. 3 is a diagram illustrating a hardware configuration example of a node management apparatus. The node management apparatus 101 is implemented as, for example, a computer as illustrated in FIG. 3.

The node management apparatus 101 illustrated in FIG. 3 includes a processor 111, a random-access memory (RAM) 112, a hard disk drive (HDD) 113, a graphic interface (I/F) 114, an input interface (I/F) 115, a reading device 116, and a communication interface (I/F) 117.

The processor 111 collectively controls the entire node management apparatus 101. The processor 111 is, for example, a central processing unit (CPU), a microprocessor unit (MPU), a digital signal processor (DSP), an application-specific integrated circuit (ASIC), or a programmable logic device (PLD). The processor 111 may also be a combination of two or more elements of the CPU, the MPU, the DSP, the ASIC, and the PLD.

The RAM 112 is used as a primary storage device of the node management apparatus 101. At least part of an operating system (OS) program and an application program to be executed by the processor 111 is temporarily stored in the RAM 112. Various kinds of data to be used in processing by the processor 111 are also stored in the RAM 112.

The HDD 113 is used as an auxiliary storage device of the node management apparatus 101. The OS program, the application program, and the various kinds of data are stored in the HDD 113. A different type of nonvolatile storage device such as a solid-state drive (SSD) may be used as the auxiliary storage device.

A display device 114a is coupled to the graphic interface 114. The graphic interface 114 displays an image on the display device 114a according to a command from the processor 111. The display device may be a liquid crystal display, an organic electroluminescence (EL) display, or the like.

An input device 115a is coupled to the input interface 115. The input interface 115 transmits a signal outputted from the input device 115a to the processor 111. The input device 115a may be a keyboard, a pointing device, or the like. The pointing device may be a mouse, a touch panel, a tablet, a touch pad, a track ball, or the like.

A portable recording medium 116a is removably mounted on the reading device 116. The reading device 116 reads data recorded in the portable recording medium 116a and transmits the data to the processor 111. The portable recording medium 116a may be an optical disk, a magneto-optical disk, a semiconductor memory, or the like.

The communication interface 117 transmits/receives data with other devices such as the nodes N1 to N6 via the network 103.

With the above-described hardware configuration, the processing function of the node management apparatus 101 may be implemented. The management target node may also be implemented as a computer having the configuration illustrated in FIG. 3, for example. The node includes, for example, a processor and has a configuration capable of executing various processes by the processor executing an application program or firmware.

Figure 4:
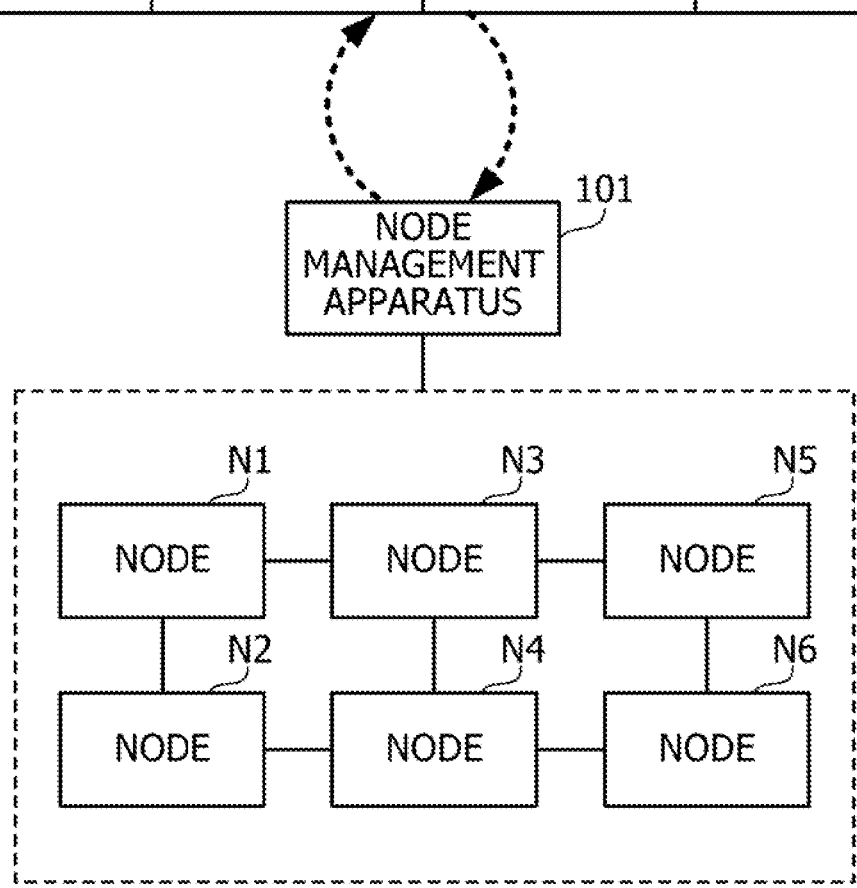
FIG. 4 is a diagram illustrating a comparative example regarding creation of an asset information list.

Next, FIG. 4 is a diagram illustrating a comparative example regarding the creation of an asset information list.

By using, for example, an asset information list 121 in which information about the information processing devices (nodes) in the system is registered, the administrator of the information processing system 100 may manage these information processing devices. FIG. 4 illustrates the asset information list 121 in which information about the management target nodes N1 to N6 is registered. In the asset information list 121, an Internet Protocol (IP) address of the node, a serial number of the node, and a function/use are registered in association with a node name that identifies each node. Of these, the function/use is, for example, information indicating a main role and processing content of the node, and is, for example, information based on a main program name, a process name, an OS name, a protocol to be used, and the like.

For example, the administrator may display the asset information list 121 on the administrator terminal 102 and perform maintenance work on the information processing system 100 while referring to the display content. For example, the administrator refers to the asset information list 121 to confirm the information of the node to be operated, and thus may perform the appropriate operation according to the function/use and the like of the node.

When the maintenance work is performed on a certain node, the maintenance work may affect other nodes. Therefore, the administrator is demanded to determine the extent to which the maintenance work will affect. For example, when the maintenance work of the node N1 is performed while the communication is performed between the node N1 and the nodes N3 and N5, the nodes N3 and N5 may not communicate with the node N1, and thus it may be said that the maintenance work also affects the nodes N3 and N5. In this case, the administrator is demanded to stop not only the operation of the node N1 but also the operation of the nodes N3 and N5 to perform the maintenance work of the node N1. Depending on the work content on the node N1, it may be demanded to perform some work on the nodes N3 and N5.

For example, the administrator may be able to specify the extent affected by the maintenance work by referring to the content of the function/use of the asset information list 121. For example, it is determined that nodes having the same content of function/use belong to the extent of influence.

Such an asset information list 121 is created and updated by, for example, the operation of the administrator using the administrator terminal 102. The administrator operates the administrator terminal 102 to update the content of the asset information list 121, for example, when a node is added, replaced, discarded, or the like. However, the number of management target nodes, (information processing devices) tends to increase with an increase in scale of a data center. When the number of management target nodes becomes enormous, the work of manually updating the asset information list 121 by the administrator becomes complicated, and errors in the update work easily occur.

For example, when an error occurs in the updated content of the asset information list 121, the extent affected by the maintenance work may not be accurately specified. As a result, the administrator may not be able to correctly perform the maintenance work, and the system may malfunction after the maintenance work. When a failure occurs after the maintenance work, the administrator may refer to the asset information list 121 to confirm whether there is a difference in the content between before and after the maintenance work. This is because the difference in the content may be related to the cause of the failure. However, when an error occurs in the updated content of the asset information list 121, the administrator may not accurately confirm the difference in the content of the asset information list 121 before and after the maintenance work, and may not obtain useful information regarding the cause of the failure.

The content displayed based on the asset information list 121 is not sufficient as the content of information to be referred to for maintenance work. For example, the function/use registered in the asset information list 121 alone is not sufficient information for specifying the extent affected by the maintenance work and for investigating the cause of the failure after the maintenance work. Therefore, it is desirable to be able to present more useful information for maintenance work to the administrator.

Although the system appears to operate correctly from the outside, the system may actually be abnormal. For example, in a case where the operation may be continued even when the type or version of software installed is wrong, the administrator may not notice an abnormality until a specific processing abnormality is found by a user of the system or the like. Therefore, even in such a case, it is desirable to be able to present useful information to the administrator so that the administrator may notice that the system is abnormal.

In the present embodiment, each management target node is provided with a function of periodically collecting communication processing content (history) executed by the node, and the information collected by this collecting function is transmitted to the node management apparatus 101. The node management apparatus 101 uses the collected information to group combinations of nodes that may be affected by the maintenance work based on a process name and a used port in communication, a communication destination, a communication periodicity, and the like. By such processing, even when there is a change in the node configuration, the node management apparatus 101 may accurately specify an extent that may be affected by the maintenance work and present the nodes belonging to the specified extent to the administrator.

The node management apparatus 101 compares the information of the group specified at a certain timing with the information of the group specified before, and displays the information indicating the difference together with the information of the groups on the administrator terminal 102. Thus, information useful for improving the efficiency and accuracy of the maintenance work may be presented to the administrator.

Figure 5:
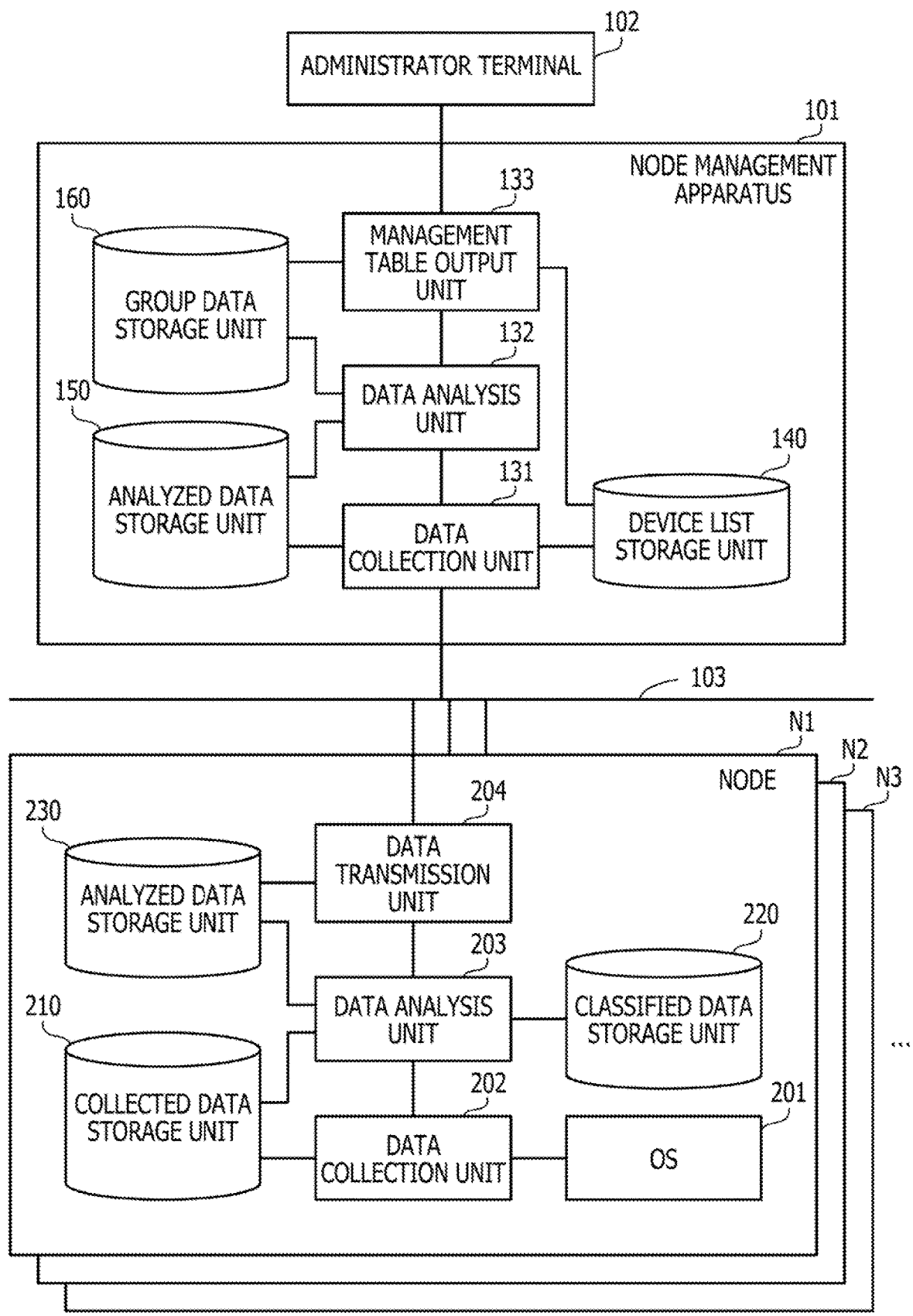
FIG. 5 is a diagram illustrating a configuration example of processing functions included in a node and a node management apparatus.

FIG. 5 is a diagram illustrating a configuration example of processing functions included in a node and a node management apparatus.

The node N1 includes an OS 201, a data collection unit 202, a data analysis unit 203, a data transmission unit 204, a collected data storage unit 210, a classified data storage unit 220, and an analyzed data storage unit 230.

The process of OS 201 is implemented by a processor (not illustrated) included in the node N1 executing an OS program. The processes of the data collection unit 202, the data analysis unit 203, and the data transmission unit 204 are implemented by a processor (not illustrated) included in the node N1 executing a predetermined application program or firmware program. The collected data storage unit 210, the classified data storage unit 220, and the analyzed data storage unit 230 are implemented as storage areas of a storage device (not illustrated) included in the node N1.

The nodes N2, N3, . . . also have similar processing functions to the node N1.

The node management apparatus 101 includes a data collection unit 131, a data analysis unit 132, a management table output unit 133, a device list storage unit 140, an analyzed data storage unit 150, and a group data storage unit 160.

The processes of the data collection unit 131, the data analysis unit 132, and the management table output unit 133 are implemented by the processor 111 executing a predetermined program. The device list storage unit 140, the analyzed data storage unit 150, and the group data storage unit 160 are implemented as storage areas of storage devices such as the RAM 112 and the HDD 113 included in the node management apparatus 101.

First, the processes of the OS 201 and the data collection unit 202 of the node will be described. The OS 201 manages processes executed in the node, such as a communication process. The OS 201 has a function of outputting information indicating a communication state. The data collection unit 202 periodically collects the content of the communication process executed in the node by using this function of the OS 201. The data collection unit 202 registers the collected information in a collected data table stored in the collected data storage unit 210.

Figure 6:
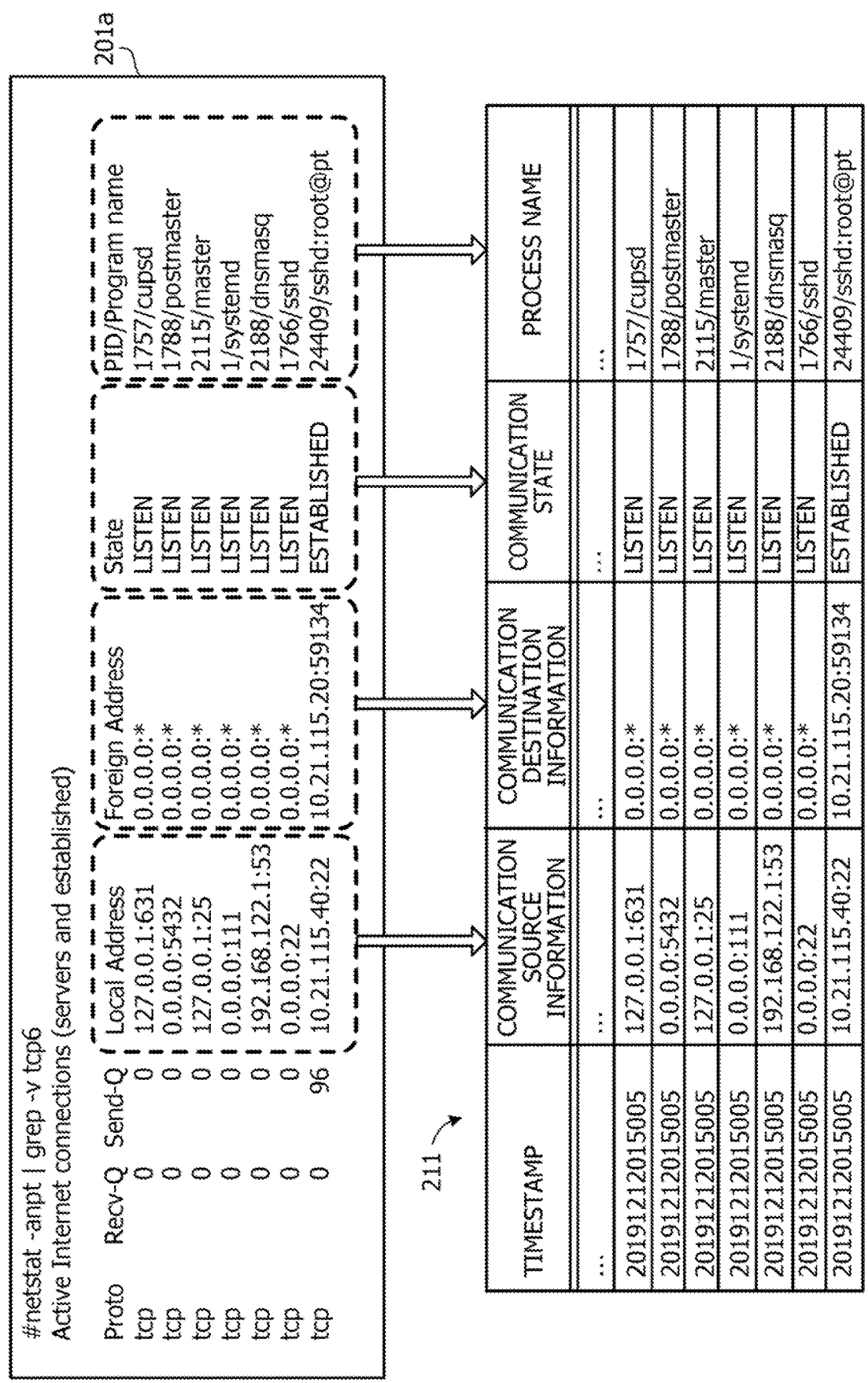
FIG. 6 is a diagram for explaining an example of a data collection process by a data collection unit.

FIG. 6 is a diagram for explaining an example of a data collection process by the data collection unit.

For example, in Windows (registered trademark) or Linux (registered trademark), information indicating a communication state may be acquired by using a netstat command. Output information 201a illustrated in FIG. 6 is an example of information outputted from the OS 201 to the data collection unit 202 when the data collection unit 202 requests information indicating a communication state by the netstat command in a case where the OS 201 is Linux.

The output information 201a includes a record for each connection, and each record includes each item of Local Address, Foreign Address, State, and PID/Program name. In the item of Local Address, an IP address and a used port of a local computer (node itself) are described. In the item of Foreign Address, an IP address of a communication destination (coupling destination) and a port number of a used port are described. In the item of State, a state of the connection is described. In the item of PID/Program name, a process ID for identifying a communication process and a program name indicating a program for executing the communication process are described.

On the other hand, the collected data table 211 stored in the collected data storage unit 210 includes each item of a timestamp, communication source information, communication destination information, a communication state, and a process name.

The timestamp indicates the time at which the data was collected. The communication source information indicates an IP address of a communication source (node itself) and a port number of a used port (standby port). In the item of communication source information, the information described in the item of Local Address in the output information 201a is registered. The communication destination information indicates an IP address of a communication destination and a port number of a used port. In the item of communication destination information, the information described in the item of Foreign Address in the output information 201a is registered.

The communication state indicates a state of communication in the connection. In the item of communication state, the information described in the item of State in the output information 201a is registered. The process name indicates a process name for identifying a communication process using the connection. In the item of the process name, the information described in the item of PID/Program name in the output information 201a is registered. This information indicates a communication process executed by the communication source device using the corresponding connection.

The data collection unit 202 periodically issues a command for requesting information indicating a communication state to the OS 201 at regular time intervals, collects the information, and accumulates the content of the collected information in the collected data table 211. In this way, the data collection unit 202 may periodically collect and accumulate the content of the communication process executed in the node (in the example of FIG. 6, information about the connection whose communication state is "ESTABLISHED").

Hereinafter, an execution cycle of data collection (collection cycle) by the data collection unit 202 is referred to as T1, and a period of a unit time "T1" is referred to as a "unit collection period". In the present embodiment, as an example, T1=5 seconds.

Figure 7:
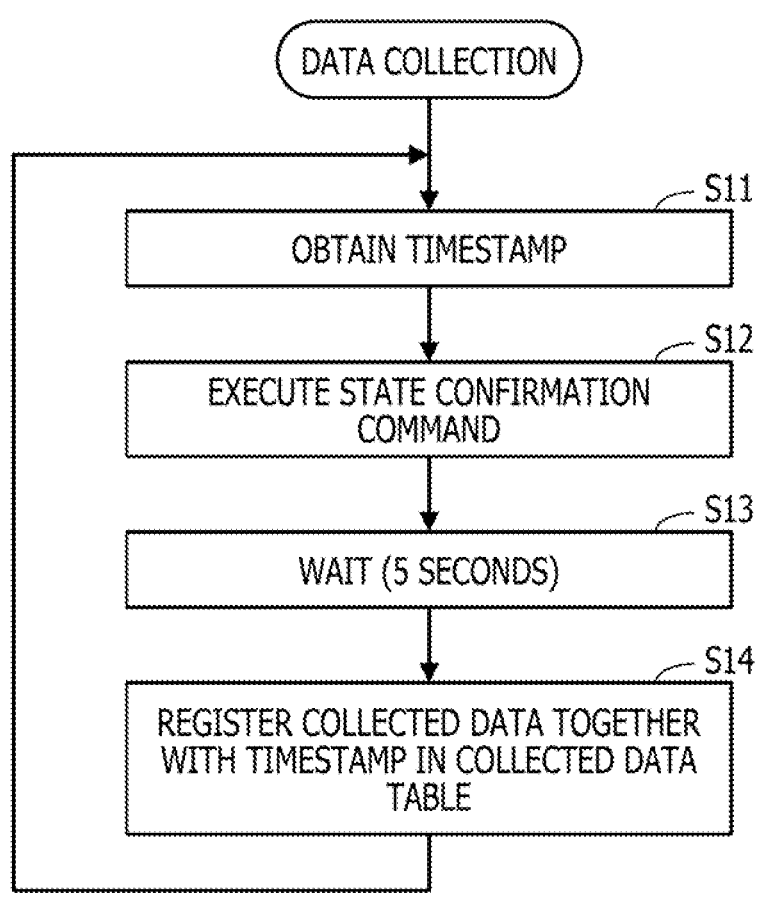
FIG. 7 is an example of a flowchart illustrating a data collection process procedure.

FIG. 7 is an example of a flowchart illustrating a data collection process procedure.

[Step S11] The data collection unit 202 acquires a timestamp (current time). The timestamp is information in seconds so that the information collected every 5 seconds may be identified.

[Step S12] The data collection unit 202 executes a state confirmation command (for example, the netstat command) to request the OS 201 to output information indicating the communication state.

[Step S13] The data collection unit 202 waits for a predetermined time (T1=5 seconds in this case).

[Step S14] The data collection unit 202 acquires information indicating the communication state in the latest 5 seconds from the OS 201. The data collection unit 202 registers the collected data together with the timestamp acquired in step S11 in the collected data table 211 in the collected data storage unit 210. As illustrated in FIG. 6, in the collected data table 211, information indicating the communication state is registered for each connection. Thereafter, the process proceeds to step S11.

As described above, by executing the process of steps S11 to S14 once, the data collected by the data collection unit 202 in the latest unit collection period is accumulated in the collected data storage unit 210. By repeatedly executing the process of steps S11 to S14, the collected data for each unit collection period is sequentially accumulated in the collected data storage unit 210.

Next, processes of the data analysis unit 203 and the data transmission unit 204 of the node will be described. The data analysis unit 203 analyzes the data collected by the data collection unit 202 and accumulated in the collected data storage unit 210, and stores the analysis result in the analyzed data storage unit 230. In this analysis, the data analysis unit 203 classifies the information about the executed communication process based on the process name, the port numbers of the communication source and the communication destination, and the IP address of the communication destination. Data indicating each of the classified information groups is temporarily stored in the classified data storage unit 220 as a classified data file. The data analysis unit 203 analyzes the regularity of the execution of the communication processes based on the data accumulated in the classified data storage unit 220, and registers the information of regular communication processes in the analyzed data storage unit 230.

As illustrated in FIGS. 6 and 7, a timestamp indicating the same time is added to the data collected by the data collection unit 202 in one unit collection period. Therefore, the collection cycle T1 is the minimum cycle at which the regularity (periodicity) of the execution of the communication processes may be determined by the data analysis unit 203.

On the other hand, when the maximum cycle at which the regularity of the execution of the communication processes (maximum determination cycle) may be determined by the data analysis unit 203 is T2, the data analysis unit 203 determines the regularity by using the data collected by the data collection unit 202 in the latest period of time equal to or longer than "T2×2". In principle, T2 may be equal to or longer than T1, but T2 is set to a value longer than T1 so that the periodicity of the execution of the communication process may be determined for a plurality of different periods.

In the following description, it is assumed that T1=5 seconds and T2=1 day. In this case, the data analysis unit 203 analyzes the regularity of the execution of the communication processes by using the data collected and stored in the latest 3 days (≥T2×2) among the collected data stored in the collected data storage unit 210.

Figure 8:
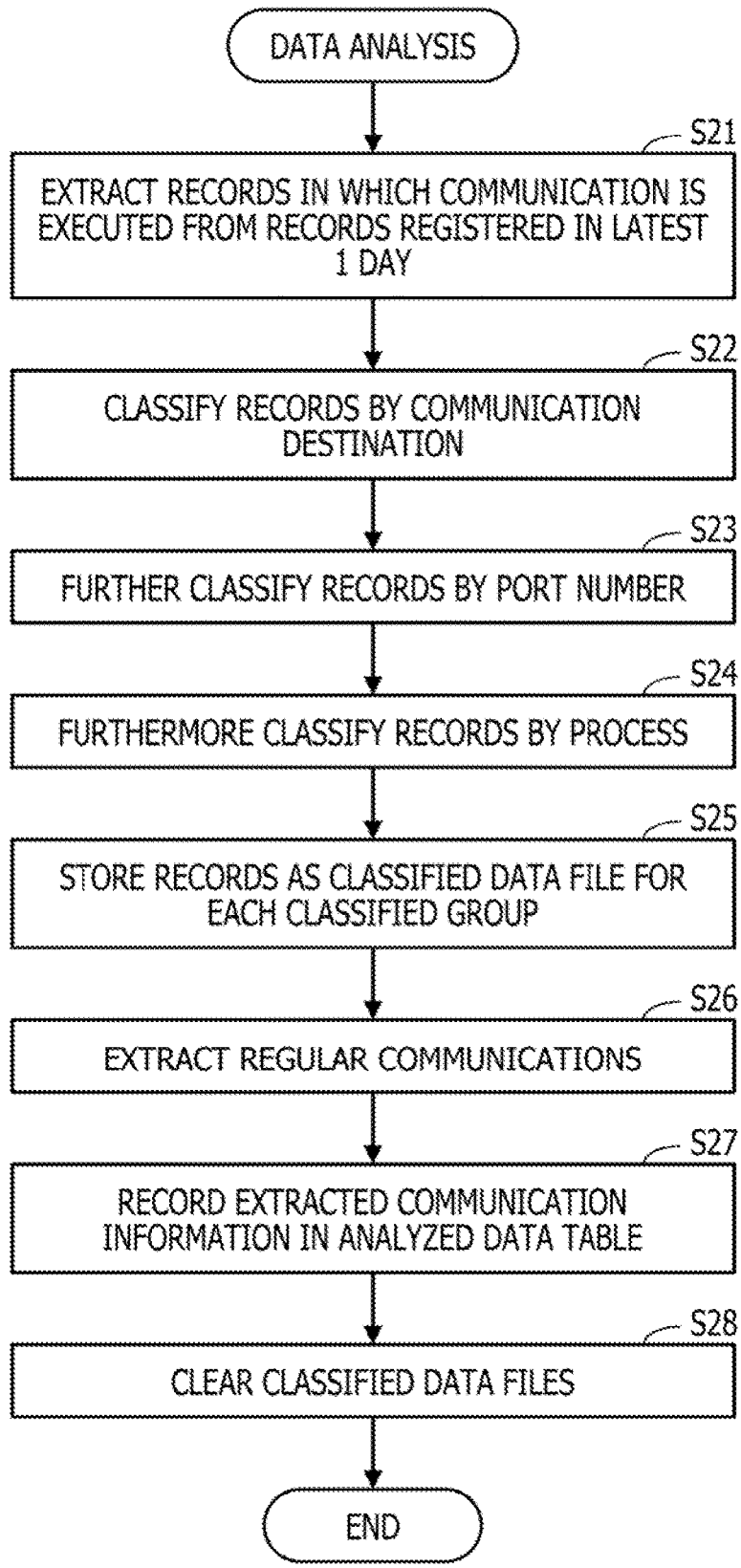
FIG. 8 is an example of a flowchart illustrating a data analysis process procedure by a data analysis unit.

FIG. 8 is an example of a flowchart illustrating a data analysis process procedure by the data analysis unit. The process of FIG. 8 is periodically executed at time intervals of T1 or more. In the present embodiment, it is assumed that the process of FIG. 8 is executed every 1 day (24 hours).

[Step S21] The data analysis unit 203 specifies, from the records registered in the collected data table 211 of the collected data storage unit 210, records registered in the latest 3 days (72 hours) based on the timestamps. The data analysis unit 203 extracts records in which communication is being executed from the specified records. In this process, for example, records related to the connection whose communication state is "ESTABLISHED" are extracted.

[Step S22] The data analysis unit 203 classifies the extracted records based on the IP addresses registered in the communication destination information. As a result, records having the same IP address of the communication destination registered in the communication destination information are classified into the same group.

[Step S23] For each of the classified groups, the data analysis unit 203 further classifies the records in the group based on the port numbers registered in the communication source information and the communication destination information. As a result, records having the same IP address of the communication destination and the same port numbers used at the communication source and the communication destination are classified into the same group.

Records having the same port number of either the communication source or the communication destination may be grouped. However, since the combination of the port numbers of the communication source and the communication destination is the same in the connection in which the type of the communication process is the same, it is desirable that the records in which the port numbers used in the communication source and the communication destination are the same be classified into the same group as described above.

[Step S24] The data analysis unit 203 furthermore classifies the records in each of the classified groups based on the process names. As a result, records having the same IP address of the communication destination, the same port numbers used at the communication source and the communication destination, and the same process name executed by the transmission source are classified into the same group.

[Step S25] The data analysis unit 203 creates a classified data file for each classified group, and stores the created classified data files in the classified data storage unit 220. At this time, in each classified data file, the process name, the communication destination address (IP address), and the port numbers described in the records included in the group are described. In the classified data file, all the timestamps described in the records included in the group are described. As a result, in the classified data file, the execution histories about the communication processes having the same process name, communication destination address, and port numbers in the latest 3 days are recorded.

[Step S26] The data analysis unit 203 extracts information of regular communication processes based on the classified data file stored in the classified data storage unit 220. In this process, the data analysis unit 203 determines, for each classified data file, whether the communication processes have been performed periodically based on the timestamps. When a plurality of communication processes having equal execution intervals are found, those communication processes are extracted as regular communication processes.

For a communication process whose execution interval is less than 12 hours, the determination is performed using only timestamps indicating a time within the latest 1 day among timestamps described in the classified data file. For a communication process whose execution interval is equal to or more than 12 hours and less than 24 hours, the determination is performed using only timestamps indicating a time within the latest 2 days among timestamps described in the classified data file. For a communication process whose execution interval is 24 hours (1 day), the determination is performed using timestamps indicating times within the latest 3 days among timestamps described in the classified data file (for example, using all timestamps in the classified data file).

Even in a regular communication process, since a deviation may occur in the execution cycle due to re-execution or the like caused by a communication error, the determination is performed in consideration of the deviation in the execution cycle. For example, in a case of determining a communication process having an execution cycle of less than 10 minutes, when the deviation of the execution cycle is within ±5 seconds, it is determined as a regular communication process. In a case of determining a communication process having an execution cycle of 1 hour, when the deviation of the execution cycle is within ±2 minutes, it is determined as a regular communication process. In a case of determining a communication process having an execution cycle of 1 day (24 hours), when the deviation of the execution cycle is within ±30 minutes, it is determined as a regular communication process.

[Step S27] The data analysis unit 203 creates an analyzed data table to which a timestamp of the current time is added, and stores the analyzed data table in the analyzed data storage unit 230. When the regular communication process is extracted in step S26, the data analysis unit 203 registers the communication source address, the communication destination address, and the process name of the communication process, together with the time indicating the execution interval, in one record in the created analyzed data table.

A plurality of regular communication processes having different execution cycles may be extracted from one classified data file. In this case, the information of each communication process is registered in a separate record in the analyzed data table.

[Step S28] The data analysis unit 203 clears (deletes) all the classified data files stored in the classified data storage unit 220. The classified data storage unit 220 is used as a work area in the data analysis process by the collected data storage unit 210.

Figure 9:
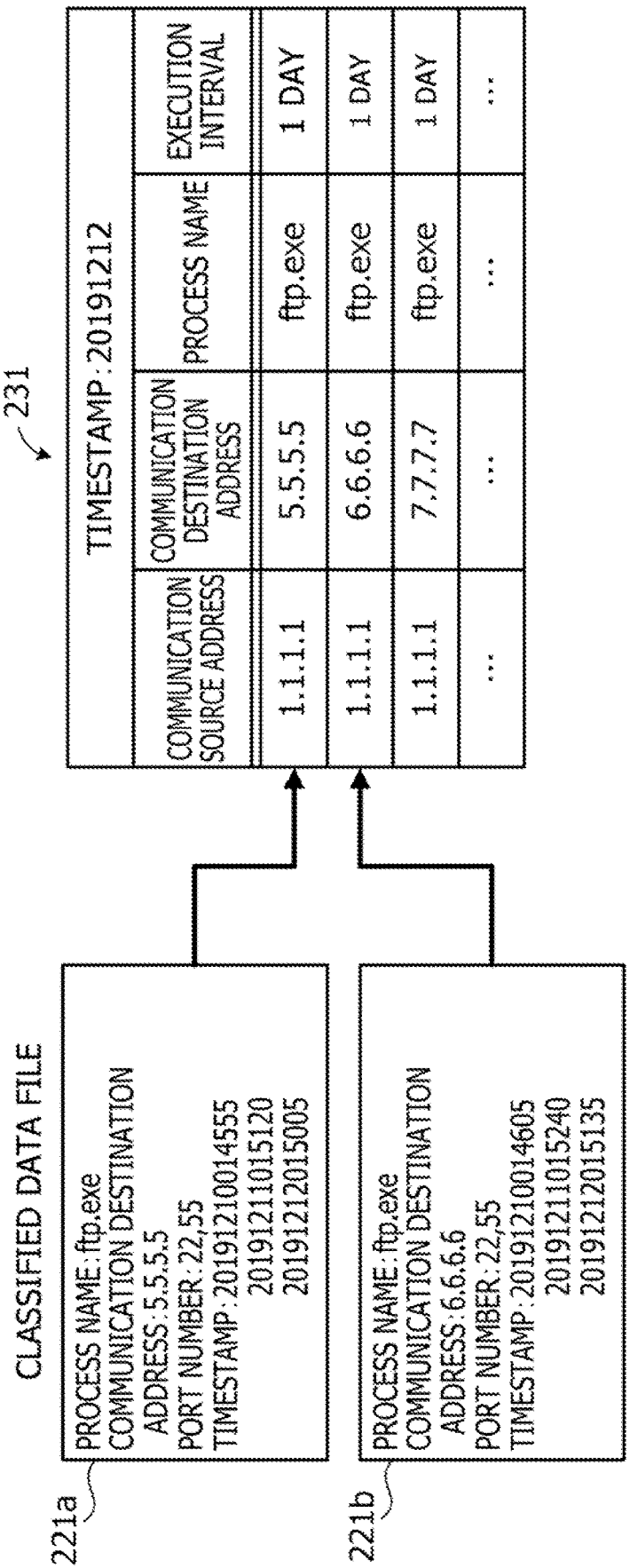
FIG. 9 is a diagram illustrating an example of classified data files and an analyzed data table.

FIG. 9 is a diagram illustrating an example of classified data files and an analyzed data table.

In FIG. 9, classified data files 221a and 221b are illustrated as examples of the classified data files created in step S25 of FIG. 8. As in this example, a process name, a communication destination address, port numbers, and a plurality of timestamps are described in the classified data file. The timestamp indicates a time at which a communication process having the same process name, communication destination address, and port numbers is executed.

On the other hand, in the analyzed data table 231 stored in the analyzed data storage unit 230, as illustrated in FIG. 9, a timestamp is added, and a record having each item of a communication source address, a communication destination address, a process name, and an execution interval is also registered. As the item of the communication source address, the IP address of the node on which the data analysis process is executed is registered. In each of the items of the communication destination address, the process name, and the execution interval, information related to a regular communication process extracted from one classified data file is registered.

The classified data files 221a and 221b and the analyzed data table 231 illustrated in FIG. 9 are created by the data analysis process executed on Dec. 12, 2019.

In the classified data file 221a, the process name "ftp.exe", the communication destination address "5.5.5.5", and the port numbers "22,55" (the port number of the communication source is "22" and the port number of the communication destination is "55") are described. In the classified data file 221a, timestamps (execution times) of 1:45:55 on Dec. 10, 2019, 1:51:20 on Dec. 11, 2019, and 1:50:5 on Dec. 12, 2019 are described. In this case, the data analysis unit 132 determines that the communication processes at one-day intervals are being executed, and registers a record of the communication process in the analyzed data table 231. In this record, a communication source address "1.1.1.1", a communication destination address "5.5.5.5", a process name "ftp.exe", and an execution interval "1 day" are registered.

In the classified data file 221b, a process name "ftp.exe", a communication destination address "6.6.6.6", and port numbers "22,55" are described. In the classified data file 221b, timestamps (execution times) of 1:46:5 on Dec. 10, 2019, 1:52:40 on Dec. 11, 2019, and 1:51:35 on Dec. 12, 2019 are described. In this case, the data analysis unit 132 determines that the communication processes at one-day intervals are being executed, and registers a record of the communication process in the analyzed data table 231. In this record, a communication source address "1.1.1.1", a communication destination address "6.6.6.6", a process name "ftp.exe", and an execution interval "1 day" are registered.

Each record in the analyzed data table 231 may further include an item of the port numbers. In this case, the port numbers described in the classified data file are registered in the item of port numbers.

As described above, the analyzed data storage unit 230 stores the analyzed data table 231 indicating the analysis result analyzed on the data analysis date indicated by the timestamp. The data transmission unit 204 transmits, in response to a request from the node management apparatus 101, the content of the analyzed data table 231 stored in the analyzed data storage unit 230 to the node management apparatus 101.

Next, the node management apparatus 101 will be described.

FIG. 10 is a diagram illustrating an example of a management target device list stored in a device list storage unit. The device list storage unit 140 stores a management target device list 141 as illustrated in FIG. 10. Information about each node to be managed by the node management apparatus 101 is registered in the management target device list 141.

The management target device list 141 includes a record corresponding to each management target node. Each record includes each item of an IP address, a serial number, an OS classification type, a login ID, and a password.

The IP address indicates an IP address assigned to a node. The serial number indicates a serial number (such as a manufacturing number) assigned to a node. The OS classification type indicates an OS classification type executed in a node. The login ID and the password are information used to log in to a node in order to acquire an analysis result from the node. The login ID indicates identification information on the administrator side for logging in to the node. The password indicates a password to be entered to log in to the node.

The management target device list 141 may be updated each time the configuration of the node changes, in response to input operation by the administrator. However, in order to accurately manage the nodes, it is desirable that the data be automatically collected from each node by the data collection unit 131 of the node management apparatus 101. As a collection method, for example, a method defined by the Simple Network Management Protocol (SNMP) or the Secure SHell (SSH) may be used.

The data collection unit 131 refers to the management target device list 141 to recognize management target nodes, and periodically collects an analysis result from each node. The collected analysis results are registered in the analyzed data table of the analyzed data storage unit 150.

Figure 11:
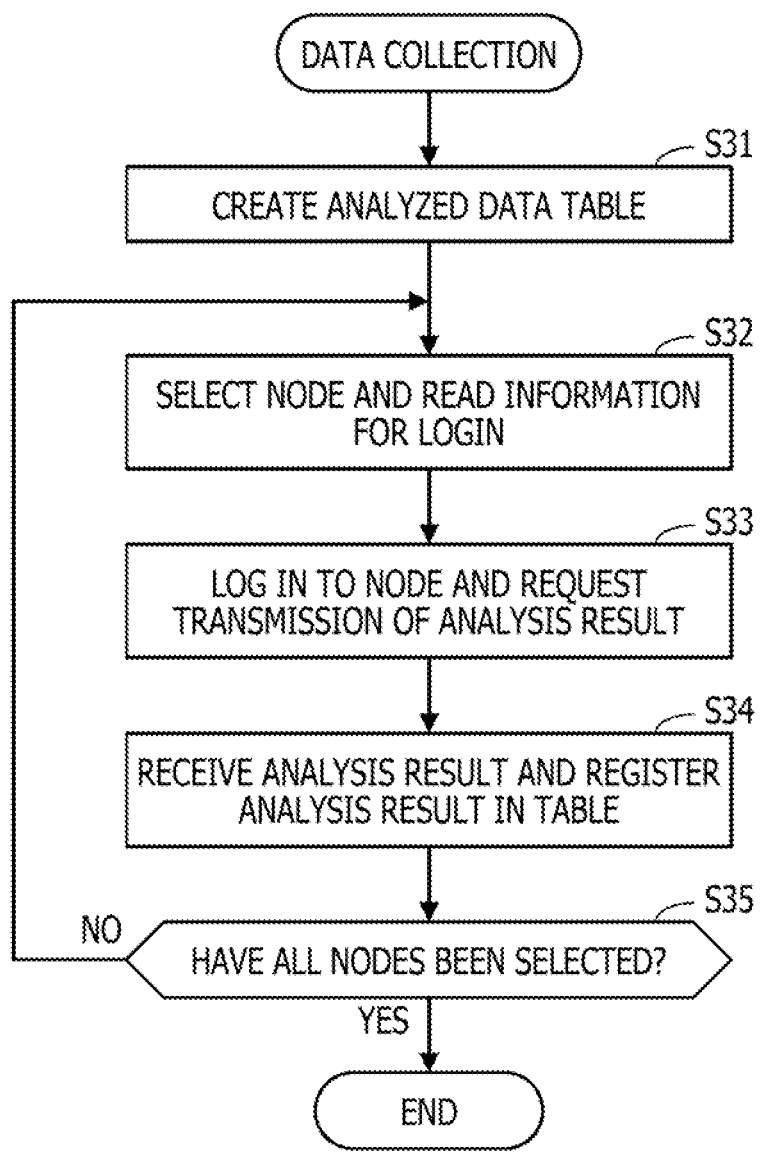
FIG. 11 is an example of a flowchart illustrating a data collection process procedure by a data collection unit of the node management apparatus.

FIG. 11 is an example of a flowchart illustrating a data collection process procedure by a data collection unit of the node management apparatus. It is assumed that the process of FIG. 11 is executed every 1 day (24 hours), which is the same as the execution cycle of the data analysis process in each node.

[Step S31] The data collection unit 131 creates an analyzed data table and stores the analyzed data table in the analyzed data storage unit 150. A timestamp indicating the current date and time is added to the created analyzed data table. In the present embodiment, since the data collection and data analysis by the node management apparatus 101 are executed at 1-day intervals, the current date is added as a timestamp.

[Step S32] The data collection unit 131 refers to the management target device list 141 and selects one management target node. The data collection unit 131 reads information for logging in to the selected node from the record of the selected node. For example, the IP address, the login ID, and the password are read.

[Step S33] The data collection unit 131 logs in to the node by using the read information and requests transmission of the analysis result. In the node, the data transmission unit 204 accepts the transmission request, reads information of each record in the analyzed data table 231 created in the latest data analysis process from the analyzed data storage unit 230, and transmits the information to the node management apparatus 101.

[Step S34] The data collection unit 131 receives the information of the record in the analyzed data table 231 (for example, the analysis result) transmitted from the node. The data collection unit 131 registers the received information of each record in each record in the analyzed data table created in step S31. As a result, each record of the node in the analyzed data table 231 is copied to the analyzed data table of the node management apparatus 101.

[Step S35] The data collection unit 131 determines whether all management target nodes have been selected. When there are unselected nodes, the data collection unit 131 advances the process to step S32, selects one of the unselected nodes, and continues the process. On the other hand, when all the management target nodes have been selected, the data collection unit 131 ends the data collection process.

Through the above process, each record in the latest analyzed data table 231 created in each management target node is copied to the newly created analyzed data table.

FIG. 12 is a diagram illustrating an example of an analyzed data table stored in the node management apparatus. An analyzed data table 151 illustrated in FIG. 12 is stored in the analyzed data storage unit 150.

As illustrated in FIG. 12, a timestamp indicating the date and time of data collection and data analysis is added to the analyzed data table 151. In the example of FIG. 12, a timestamp indicating Dec. 12, 2019 is added. Similar to the analyzed data table 231 of the node, each record in the analyzed data table 151 includes each item of a communication source address, a communication destination address, a process name, and an execution interval. When the analyzed data table 231 of the node includes the item of the port numbers, the analyzed data table 151 also includes the item of the port numbers.

The data analysis unit 132 uses the one analyzed data table 151 created as described above to group nodes, each performing the same type of communication with similar regularity. In this grouping, nodes, each performing communication having the same communication source or communication destination, the same execution interval, and the same or related process name, are classified into one group together with information indicating the content of the communication. This classification process is performed by grouping the records in the analyzed data table 151, and the grouped records are registered in a group data table of the group data storage unit 160 in a state in which the groups may be identified.

Figure 13:
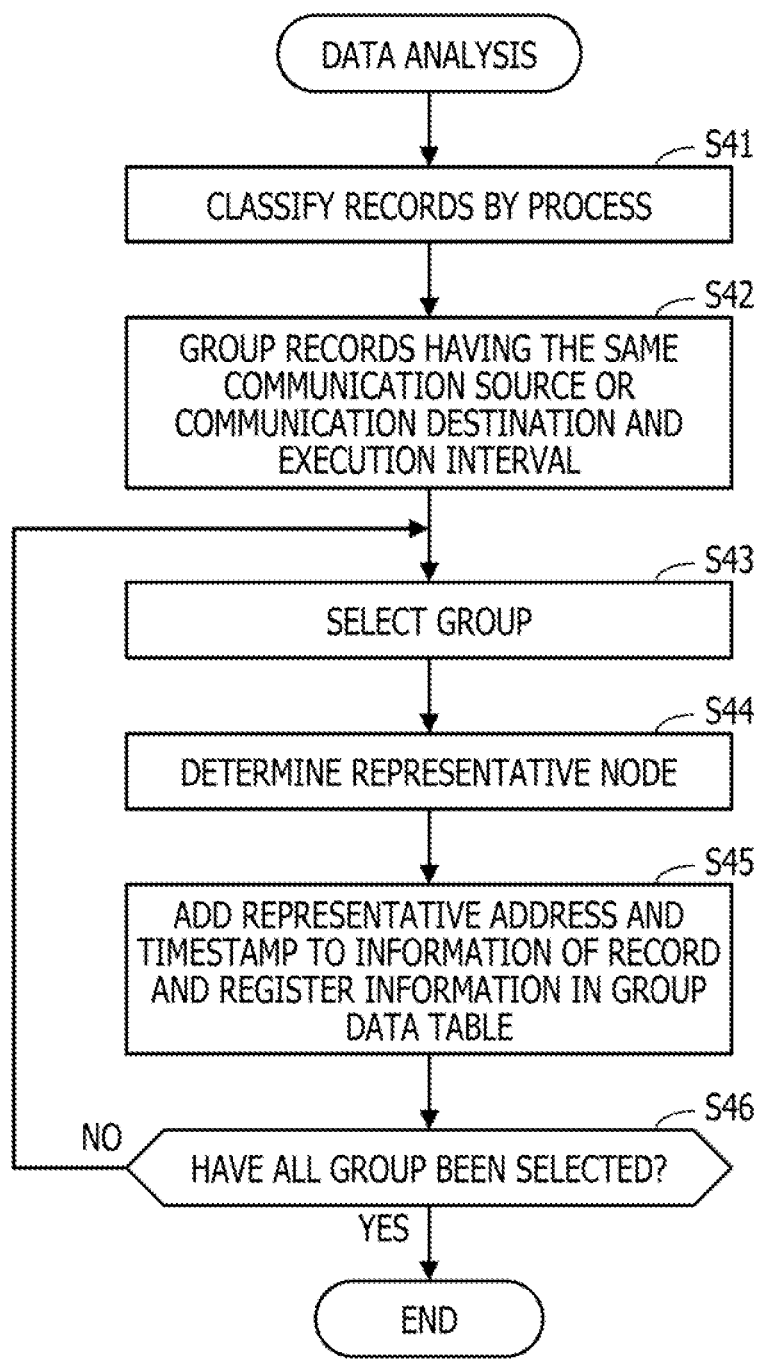
FIG. 13 is an example of a flowchart illustrating a data analysis process procedure by a data analysis unit of the node management apparatus.

FIG. 13 is an example of a flowchart illustrating a data analysis process procedure by a data analysis unit of the node management apparatus.

[Step S41] The data analysis unit 132 refers to the latest analyzed data table 151 stored in the analyzed data storage unit 150, and classifies the records in the analyzed data table 151 based on the process names.

[Step S42] For each of the classified record groups, the data analysis unit 132 groups records having the same communication source or the same communication destination, and the same execution interval of the records included in the record group.

[Step S43] The data analysis unit 132 selects one group classified in step S42.

[Step S44] The data analysis unit 132 determines a representative node from the nodes registered in the records included in the selected group. For example, the node having the largest number of registrations in the items of the communication source address and the communication destination address is determined as the representative node.

[Step S45] The data analysis unit 132 adds the IP address (representative address) of the determined representative node and the timestamp added to the analyzed data table 151 of the reference destination (date in this example) to the information of the record included in the selected group, and registers the information in the group data table. In the group data table, a record corresponding to each record included in the group is created.

[Step S46] The data analysis unit 132 determines whether all classified groups have been selected. When there are unselected groups, the data analysis unit 132 advances the process to step S43, selects one unselected group, and continues the process. On the other hand, when all the groups have been selected, the data analysis unit 132 ends the data analysis process.

FIG. 14 is a diagram illustrating a first example of information registered in a group data table. A group data table 161 includes each item of a communication source address, a communication destination address, a process name, an execution interval, a representative address, a date, and a main identifier.

Among these items, in each of the items of the communication source address, the communication destination address, the process name, and the execution interval, the data in the same name item in the analyzed data table 151 is registered. The address of the representative node determined in step S44 of FIG. 13 is registered in the item of the representative address. The timestamp added to the analyzed data table 151 of the reference destination is registered in the item of the date. This date indicates the date on which the group was created by the data analysis. In the group data table 161, among the registered records, records having the same process name, execution interval, representative address, and date are identified as records belonging to the same group.

When the group to which the records belong is a main group (described later) for a certain node, the IP address of the node is registered in the item of the main identifier. In the item of the main identifier, an IP address is not registered in an initial state (for example, NULL is registered).

FIG. 14 illustrates a case where grouping is performed in accordance with a first grouping rule in steps S41 and S42 of FIG. 13. According to the first grouping rule, among the records in the analyzed data table 151, records with matching process names, matching either communication sources or communication destinations, and matching execution intervals are grouped.

For example, in FIG. 14, records R1 to R3 in which the communication source address is "1.1.1.1", the process name is "ftp.exe", and the execution interval is "1 day" are classified into one group. Records R4 and R5 in which the communication source address is "2.2.2.2", the process name is "ftp.exe", and the execution interval is "60 minutes" are classified into another group. Records R6 and R7 in which the communication source address is "7.7.7.7", the process name is "httpd.exe", and the execution interval is "5 seconds" are classified into still another group.

FIG. 15 is a diagram illustrating a second example of information registered in a group data table. FIG. 15 illustrates a case where grouping is performed in accordance with a second grouping rule in steps S41 and S42 of FIG. 13. In the second grouping rule, among the groups classified according to the first grouping rule, groups in which process names are related, the execution interval is the same, and correspondence relationships between communication sources and communication destinations are reversed are integrated into one group. "Process names are related" means that the respective process names are process names that form a pair in a communication process, for example, a requester side process and a standby side process for communication.

For example, in FIG. 15, according to the first grouping rule, the records R11 to R13 are classified into one group (referred to as a first group), and the records R14 to R16 are classified into another group (referred to as a second group). Between these groups, the process name "ftpd.exe" of the first group is the name of the standby process corresponding to the process name "ftp.exe" of the second group. The correspondence relationship between the communication source address and the communication destination address is reversed between the first group and the second group. Therefore, the first group and the second group are integrated, and the records R11 to R16 are classified into the same group.

Through the above-described process by the data analysis unit 132, the records indicating the highly relevant communication processes are grouped. The node group registered as the communication source and the communication destination in one record is a node group in which highly relevant communication processes are being executed, and is estimated to be a node group that may be significantly affected by the maintenance work. For example, in this node group, the communication processes of the same type are executed at the same execution interval using duplicate nodes. Therefore, when maintenance work is performed on one node in the node group, an error in communication process may occur in other nodes in the node group. When the program is updated in one node in the node group, it is often demanded to update the programs in other nodes in the node group.

Therefore, the management table output unit 133 displays the information about the nodes and the communication processes in the group on the administrator terminal 102, so that it is possible to accurately present, to the administrator, a plurality of nodes that may be greatly affected by the maintenance work. For example, in the data analysis, the nodes are grouped based on the type of the communication process and the execution interval, instead of simply grouping the nodes with which communication has been performed. As a result, it is possible to estimate with high accuracy a group of nodes having high relevancy or dependency that may demand some measures during maintenance work.

By viewing the information displayed in this way, the administrator may easily and reliably specify a plurality of nodes that may be greatly affected by the maintenance work. Accordingly, the administrator may perform maintenance work with higher reliability. The administrator may easily specify a node that is demanded to confirm whether or not an abnormality has occurred.

The node management apparatus 101 may also use the information of the group classified by the data analysis unit 132 for node control. For example, when maintenance work is performed on a certain node, the node management apparatus 101 may specify a group including the node and automatically stop the operation of each node included in the specified group. As a result, it is possible to reduce the possibility that an abnormality occurs in the node due to the influence of the maintenance work.

A specific example of grouping will be described.

Figure 16:
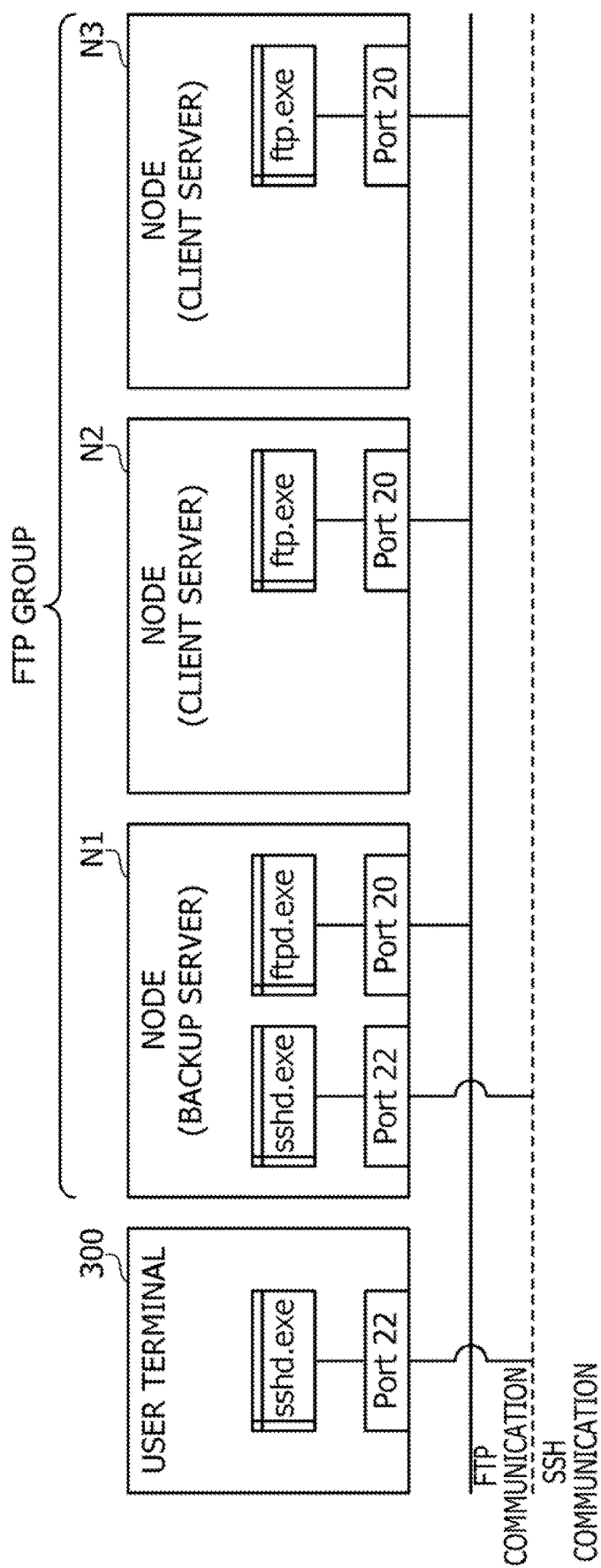
FIG. 16 is a diagram illustrating a first example of grouping.

FIG. 16 is a diagram illustrating a first example of grouping.

FIG. 16 illustrates a case where a node N1 operates as a backup server and nodes N2 and N3 operate as clients to the backup server. In each of the nodes N2 and N3, a process "ftp.exe" that communicates using a port 20 operates, and in the node N1, a process "ftpd.exe" that is a standby process for the process "ftp.exe" operates. The process "ftpd.exe" performs communication using a port 20. It is assumed that File Transfer Protocol (FTP) communication for a backup process is periodically executed between the process "ftp.exe" of each of the nodes N2 and N3 and the process "ftpd.exe" of the node N1.

In a user terminal 300, a process "sshd.exe" that performs communication using a port 22 operates, and in the node N1, a process "sshd.exe" that performs communication using a port 22 operates. It is assumed that SSH communication is executed between the process "sshd.exe" of the user terminal 300 and the process "sshd.exe" of the node N1. However, the SSH communication is executed at irregular timing.

In such a case, the processes "ftp.exe" of the nodes N2 and N3 and the process "ftpd.exe" of the node N1 are grouped. In FIG. 16, this group is illustrated as an "FTP group". On the other hand, the process "sshd.exe" of the node N1 is not included in the group because regular communication is not performed.

As described above, in the case of FIG. 16, the information of the group to which the processes "ftp.exe" of the nodes N2 and N3 and the process "ftpd.exe" of the node N1 belong is displayed on the administrator terminal 102, so the administrator may specify the nodes N1, N2, and N3 as the nodes that may be greatly affected by the maintenance work.

Figure 17:
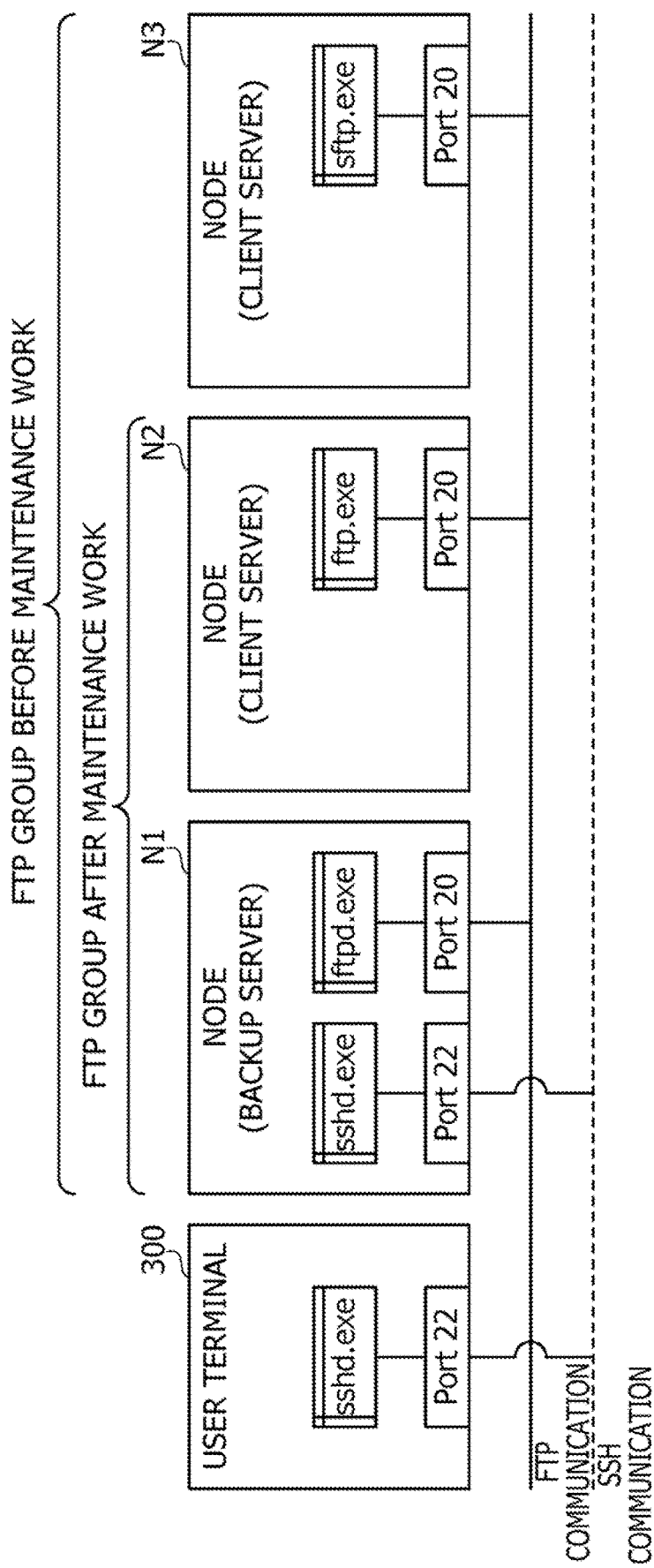
FIG. 17 is a diagram illustrating a second example of grouping.

FIG. 17 is a diagram illustrating a second example of grouping. In FIG. 17, it is assumed that the maintenance work is performed in the state of FIG. 16, and the process for the FTP communication, which operates in the node N3, is changed from the process "ftp.exe" to a process "sftp.exe". It is assumed that FTP communication is performed between the process "sftp.exe" of the node N3 and the process "ftpd.exe" of the node N1 at the same time interval by using the same port as the FTP communication between the process "ftp.exe" of the node N2 and the process "ftpd.exe" of the node N1.

When the node management apparatus 101 collects and analyzes data after a predetermined time from the execution of the maintenance work, the process "ftp.exe" of the node N2 and the process "ftpd.exe" of the node N1 are grouped as the "FTP group". On the other hand, this group does not include the process "sftp.exe" of the node N3. Actually, the process "sftp.exe" of the node N3 and the process "ftpd.exe" of the node N1 are classified into a different group.

After the maintenance work, when the information of the group including the process "ftp.exe" of the node N2 and the process "ftpd.exe" of the node N1 is displayed on the administrator terminal 102, displaying that the node N3 is removed from this group is also useful for the confirmation work by the administrator. For example, when a program corresponding to the process "sftp.exe" is erroneously installed in the node N3 by maintenance work, displaying that the node N3 is removed from the group as described above may remind the administrator that the node N3 does not operate as intended.

Although not illustrated, for example, even when the operation of the process "ftp.exe" of the node N3 is stopped due to an abnormality in the state illustrated in FIG. 16, the process "ftp.exe" of the node N3 is removed from the "FTP group" in the same manner as in FIG. 17 when the node management apparatus 101 collects and analyzes the data thereafter. For example, when the process "ftp.exe" of the node N3 does not perform periodic communication due to an abnormality in the state of FIG. 16 (for example, when the communication execution interval becomes irregular), the process "ftp.exe" of the node N3 is removed from the "FTP group" as in FIG. 17. Even in such a case, by displaying that the node N3 is removed from the group that includes the process "ftp.exe" of the node N2 and the process "ftpd.exe" of the node N1, the administrator may notice that an abnormality has occurred in the node N3.

Although an abnormality occurs in the operation of the process "ftp.exe" of the node N3 after the maintenance work, the abnormality does not appear in appearance in some cases. Even in this case, by displaying that the node N3 is removed from the group that includes the process "ftp.exe" of the node N2 and the process "ftpd.exe" of the node N1, the administrator may be able to notice that an abnormality has occurred in the node N3.

Thus, the management table output unit 133 of the node management apparatus 101 not only displays the information of the group obtained by the latest data analysis by the data analysis unit 132 on the administrator terminal 102, but also simultaneously displays the information indicating a difference with the group created by the past data analysis. Hereinafter, a group created by the latest data analysis is referred to as a "current group", and a group created by a previous data analysis is referred to as a "past group". A group created by data analysis 1 day before the latest data analysis is referred to as a "previous group".

In the present embodiment, as an example, the management table output unit 133 determines a "main group" indicating a group in which a main communication process is performed for each node in order to specify a pair to be compared between the current group and the past group. The management table output unit 133, when displaying the information of the group to which a certain node belongs on the administrator terminal 102, compares a main group of the current group to which the node belongs with a main group of the past group to which the node belongs. The management table output unit 133 displays information indicating a difference between the main groups on the administrator terminal 102.

Figure 18:
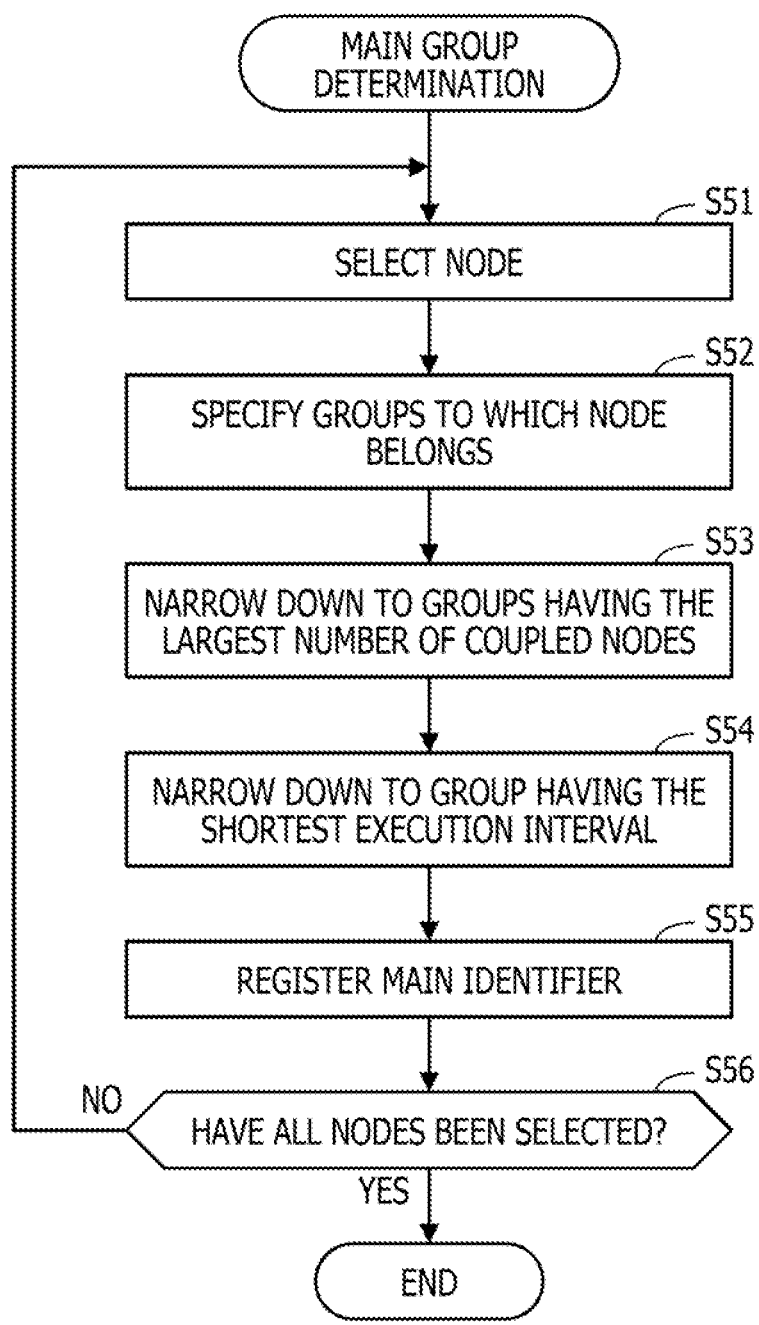
FIG. 18 is an example of a flowchart illustrating a main group determination process procedure by a management table output unit.

FIG. 18 is an example of a flowchart illustrating a main group determination process procedure by the management table output unit. The process of FIG. 18 may be continuously executed, for example, when the data analysis process of FIG. 13 by the data analysis unit 132 is completed.

[Step S51] The management table output unit 133 refers to the management target device list 141 stored in the device list storage unit 140 and selects one management target node.

[Step S52] The management table output unit 133 specifies all groups to which the selected node belongs from the latest group data table 161.

[Step S53] The management table output unit 133 narrows down the specified groups to groups having the largest number of coupled nodes (nodes belonging to the group). The reason why the groups are narrowed down to the groups having the largest number of coupled nodes is that it is considered that the number of nodes in which the same types of communication are executed is large and that the extent affected by the maintenance work is the widest.

[Step S54] When the groups are narrowed down to a plurality of groups in step S53, the management table output unit 133 further narrows down the narrowed down groups to a group having the shortest execution interval. The reason why the groups are narrowed down to the group having the shortest execution interval is that the higher the execution frequency of communication is, the higher the relevancy between the nodes is.

[Step S55] The one group narrowed down in steps S53 and S54 is set as a main group corresponding to the selected node. The management table output unit 133 registers the IP address of the selected node in the item of the main identifier of each record corresponding to the main group of the records in the group data table 161. IP addresses of a plurality of nodes may be registered in the main identifier item.

[Step S56] The management table output unit 133 determines whether all management target nodes have been selected. When there are unselected nodes, the management table output unit 133 advances the process to step S51, selects one of the unselected nodes, and continues the process. On the other hand, when all the management target nodes have been selected, the management table output unit 133 ends the main group determination process.

Through the above process, the main group is determined for each node. The main group is determined for each data analysis process by the data analysis unit 132 (for example, for each group data table 161).

Figure 19:
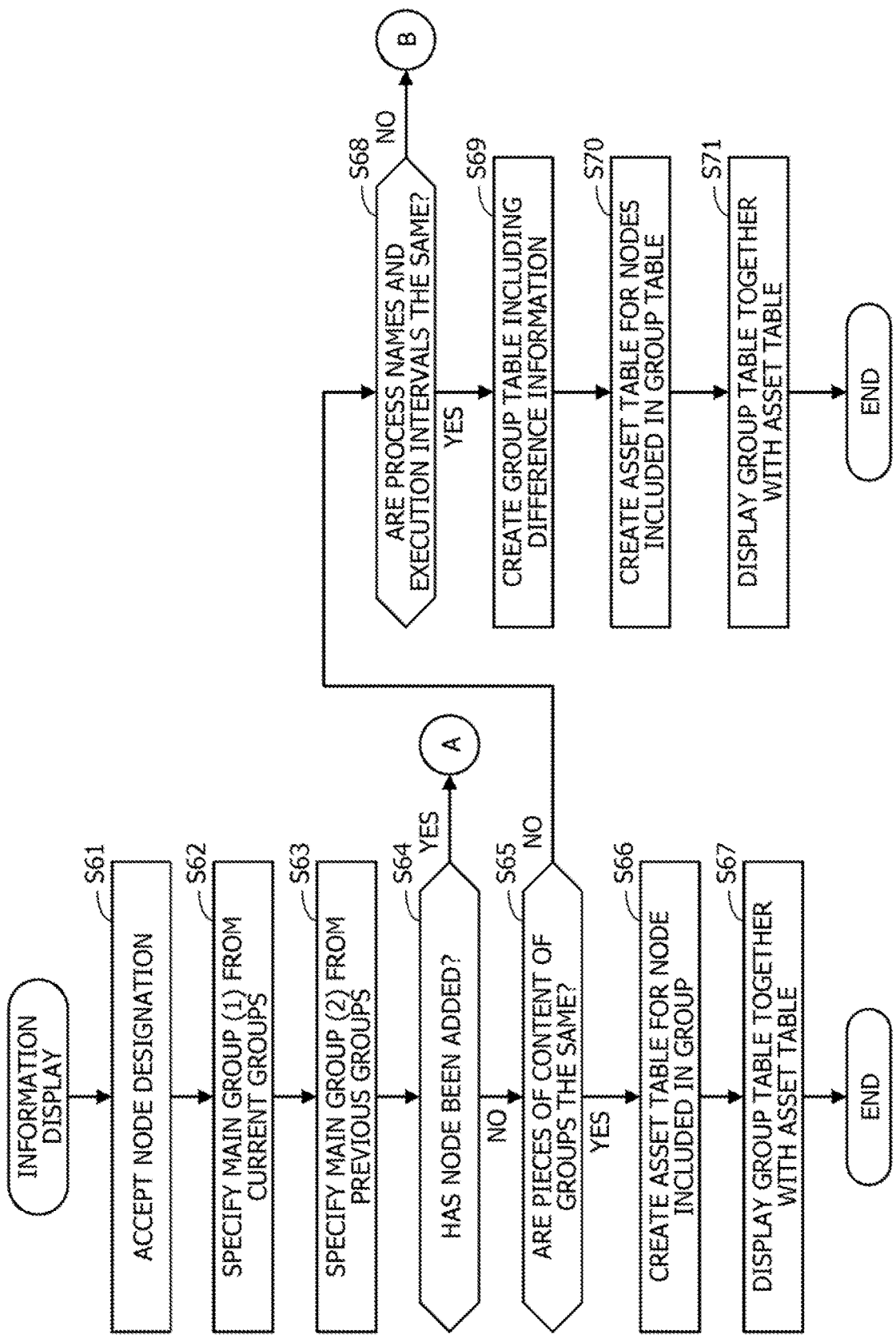
FIG. 19 is an example (part 1) of a flowchart illustrating an information display process procedure by the management table output unit.
Figure 20:
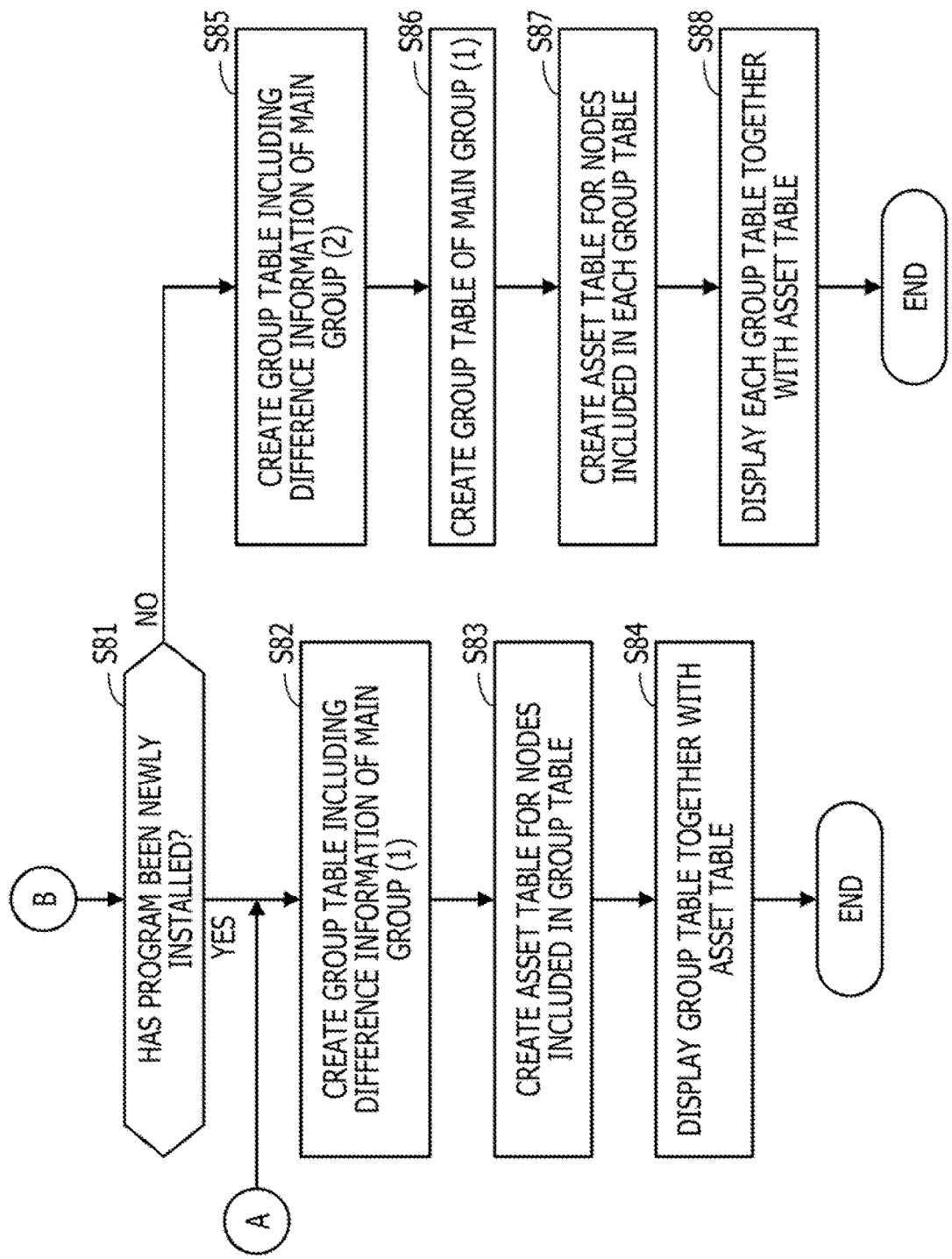
FIG. 20 is an example (part 2) of a flowchart illustrating an information display process procedure by the management table output unit.

FIGS. 19 and 20 are examples of flowcharts illustrating an information display process procedure by the management table output unit.

[Step S61] The management table output unit 133 accepts a node designation from the administrator via the administrator terminal 102. For example, a node on which the administrator is going to perform maintenance work, a node on which the maintenance work has been completed, or a node that the administrator thinks is related to these nodes is designated by the operation of the administrator.

[Step S62] The management table output unit 133 specifies a main group corresponding to the designated node from the current group. In this process, the group data table 161 indicating the latest timestamp is referred to, and the group in which the IP address of the designated node is registered in the item of the main identifier is specified as the main group. Hereinafter, the specified main group is referred to as a "main group (1)", and the referred group data table 161 is referred to as a "group data table (1)".

[Step S63] The management table output unit 133 specifies a main group corresponding to the designated node from the previous group. In this process, the group data table 161 in which the timestamp indicates the second latest date is referenced, and the group in which the IP address of the designated node is registered in the item of the main identifier is specified as the main group. Hereinafter, the specified main group is referred to as a "main group (2)", and the referenced group data table 161 is referred to as a "group data table (2)".

[Step S64] The management table output unit 133 determines whether the node designated in step S61 is a node newly added to the system. When the main group (2) may not be specified in step S63, it is determined that the designated node is a newly added node. When it is determined that the node is a newly added node, the management table output unit 133 advances the process to step S82 in FIG. 20, and when it is determined that the node is not newly added node, advances the process to step S65.

[Step S65] The management table output unit 133 determines whether the content of the main group (1) is the same as the content of the main group (2). In this determination, the content of each record belonging to the main group (1) in the group data table (1) is compared with the content of each record belonging to the main group (2) in the group data table (2). When the pieces of content of the respective groups are completely the same, the management table output unit 133 advances the process to step S66, and when at least parts of the pieces of content of the respective groups are different, advances the process to step S68.

[Step S66] The management table output unit 133 creates an asset table for each node included in the main group (1). In this process, the management target device list 141 of the device list storage unit 140 is referenced, information (IP address, serial number, OS classification type, login ID, and password) for each node is read, and an asset table that displays a list of these pieces of information is created.

[Step S67] The management table output unit 133 creates a group table indicating information of the main group (1) based on the group data table (1). The management table output unit 133 displays the created group table together with the asset table created in step S66 on the display device of the administrator terminal 102.

FIG. 21 is a diagram illustrating a first display example of a group table and an asset table. In step S67 of FIG. 19, for example, a group table 171a and an asset table 172a as illustrated in FIG. 21 are displayed on the display device of the administrator terminal 102.

In the group table 171a illustrated in FIG. 21, information of a group identified by a process name "ftp.exe", an execution interval "1 day", a representative address "1.1.1.1", and a date "20191212" is displayed. As the group information, information of each record belonging to the group registered in the group data table (1) is displayed in a list.

The case where step S67 is executed is a case where the configuration of the current group has not changed from the previous group. For example, it has not changed from the previous data analysis that the nodes indicated by the IP addresses "1.1.1.1", "5.5.5.5", "6.6.6.6", and "7.7.7.7" are included in the above group. In this case, in the group table 171a, only the information of each record belonging to the group is displayed in a list, and the information indicating a difference is not displayed.

In the asset table 172a, information about each node displayed in the group table 171a is extracted from the management target device list 141 and displayed.

The case where such a group table 171a and an asset table 172a are displayed is a case where one of the nodes indicated by the IP addresses "1.1.1.1", "5.5.5.5", "6.6.6.6", and "7.7.7.7" is designated in step S61 of FIG. 19.

For example, the administrator displays the group table 171a as illustrated in FIG. 21 before performing maintenance work of the node indicated by the IP address "7.7.7.7". Accordingly, the administrator may easily and accurately specify the nodes indicated by the IP addresses "1.1.1.1", "5.5.5.5", and "6.6.6.6" as other nodes that may be greatly affected by the maintenance work of the node indicated by the IP address "7.7.7.7".

The description will be continued below with reference to FIG. 19.

[Step S68] The management table output unit 133 determines whether the process name and the execution interval of the main group (1) are the same as the process name and the execution interval of the main group (2). When the management table output unit 133 determines that the process name and the execution interval are the same, the process proceeds to step S69. When the management table output unit 133 determines that the process name and the execution interval are not the same (when the content of at least one of the items is different), the process proceeds to step S81 in FIG. 20.

[Step S69] The management table output unit 133 creates a group table including difference information.

[Step S70] The management table output unit 133 creates an asset table that displays a list of information about each node included in the created group table.

[Step S71] The management table output unit 133 displays the group table created in step S69 together with the asset table created in step S70 on the display device of the administrator terminal 102.

The process of steps S69 to S71 will be described with reference to FIGS. 22 and 23. Cases in which steps S69 to S71 are executed are a case in which a node is added to a certain group and a case in which a node is deleted from a certain group. An example of the former case is illustrated in FIG. 22, and an example of the latter case is illustrated in FIG. 23.

FIG. 22 is a diagram illustrating a second display example of a group table and an asset table.

In a group table 171b illustrated in FIG. 22, information of a group identified by a process name "ftp.exe", an execution interval "1 day", a representative address "1.1.1.1", and a date "20191212" is displayed. In the group table 171b, a record R21 including a communication source address "1.1.1.1" and a communication destination address "8.8.8.8" is displayed surrounded by a thick line as a record indicating the added communication process. For example, the record R21 corresponds to the difference information. In the item of the difference of the record R21, character information indicating that the record R21 has been added (the communication process indicated by the record R21 has been added) is displayed.

In the case of FIG. 22, a node indicated by an IP address "8.8.8.8" is added to a group including nodes indicated by IP addresses "1.1.1.1", "5.5.5.5", "6.6.6.6", and "7.7.7.7". In this case, in the process of FIG. 19, the group including the nodes indicated by IP addresses "1.1.1.1", "5.5.5.5", "6.6.6.6", and "7.7.7.7" is specified as the main group (2). The group including the nodes indicated by IP addresses "1.1.1.1", "5.5.5.5", "6.6.6.6", "7.7.7.7", and "8.8.8.8" is specified as the main group (1). However, in step S61, any of the nodes indicated by the IP addresses "1.1.1.1", "5.5.5.5", "6.6.6.6", and "7.7.7.7" is designated.

In step S69, the information of the record that is the record in the main group (1) but is not included in the main group (2) (record that includes the communication source address "1.1.1.1" and the communication destination address "8.8.8.8") is displayed in the group table 171b as difference information. In step S70, information about each node included in such a group table 171b is read from the management target device list 141 of the device list storage unit 140 and displayed in the asset table 172b.

In the example of FIG. 22, the group table 171b is displayed after the completion of the maintenance work for adding the node indicated by the IP address "8.8.8.8", so that the administrator may easily confirm that this node has been added and the information of the added node. The administrator may also confirm whether the added node operates as intended by confirming the content of the information.

FIG. 23 is a diagram illustrating a third display example of a group table and an asset table.

In a group table 171c illustrated in FIG. 23, information of a group identified by a process name "ftp.exe", an execution interval "1 day", a representative address "1.1.1.1", and a date "20191212" is displayed. In the case of FIG. 23, the node indicated by the IP address "7.7.7.7" is deleted from the group including the nodes indicated by the IP addresses "1.1.1.1", "5.5.5.5", "6.6.6.6", and "7.7.7.7". However, in step S61, one of the nodes indicated by the IP addresses "1.1.1.1", "5.5.5.5", and "6.6.6.6" is designated.

In this case, in the process of FIG. 19, the group including the nodes indicated by IP addresses "1.1.1.1", "5.5.5.5", "6.6.6.6", and "7.7.7.7" is specified as the main group (2). A group including nodes indicated by IP addresses "1.1.1.1", "5.5.5.5", and "6.6.6.6" is specified as the main group (1).

In step S69, the information of the record that is the record in the main group (2) but is not included in the main group (1) (record that includes the communication source address "1.1.1.1" and the communication destination address "7.7.7.7") is displayed in the group table 171c as difference information. As illustrated in FIG. 23, in the group table 171c, information of the record is displayed in a record R22. The record R22 is displayed surrounded by a thick broken line to indicate that it is difference information (deleted record). In the item of the difference of the record R22, character information indicating that the record R22 has been deleted (the communication process indicated by the record R22 has been deleted) is displayed.

In step S70, information about each node included in such a group table 171c is read from the management target device list 141 of the device list storage unit 140 and displayed in an asset table 172c. For example, in the asset table 172c, not only the information of the nodes included in the current group but also the information of the nodes included in the previous corresponding group is displayed.

In the example of FIG. 23, the group table 171c is displayed after the completion of the maintenance work for deleting (discarding) the node indicated by the IP address "7.7.7.7", so the administrator may easily confirm that this node has been deleted and the information of the deleted node. The administrator may also confirm whether each node included in the group after node deletion operates as intended by confirming the content of the information.

The description will be continued below with reference to FIG. 20.

[Step S81] The management table output unit 133 determines whether a program corresponding to the processing process of the main group (1) has been newly installed in the node designated in step S61 of FIG. 19. The case where the program has been newly installed is a case where the node designated in step S61 has already been incorporated in the system, but a new program has been installed in this node by maintenance work. In this case, a group unrelated to the main group (2) is specified as the main group (1), and it is determined to be "No" in step S68.

In step S81, the previous main group for any other node included in the main group (1) is specified from the group data table (2). Hereinafter, the specified main group is referred to as a "main group (3)". When the node designated in step S61 is included in the main group (3), it is determined that a program corresponding to the processing process of the main group (1) has been newly installed in this node.

When it is determined that the program has been newly installed, the management table output unit 133 advances the process to step S82, and when it is determined that the program has not been newly installed, the management table output unit 133 advances the process to step S85.

[Step S82] The management table output unit 133 creates a group table indicating information of the main group (1). In this group table, a record in which the node designated in step S61 is registered is displayed as difference information. For example, as with the record R21 of FIG. 22, the record in which the node designated in step S61 is registered is surrounded by a thick line, and information indicating that the record is added is displayed in the item of the difference.

[Step S83] The management table output unit 133 creates an asset table that displays a list of information about each node included in the created group table.

[Step S84] The management table output unit 133 displays the group table created in step S82 together with the asset table created in step S83 on the display device of the administrator terminal 102.

[Step S85] The case determined as "No" in step S81 is a case where the node designated in step S61 has been deleted from the main group (2). For example, there is a case where the program corresponding to the communication process of the main group (2) has been uninstalled from the node designated in step S61.

In this case, the management table output unit 133 first creates a group table indicating information of the main group (2). In this group table, a record in which the node designated in step S61 is registered is displayed as difference information.

[Step S86] Subsequently, the management table output unit 133 creates a group table indicating information of the main group (1). In this group table, difference information is not displayed.

[Step S87] The management table output unit 133 creates an asset table that displays a list of the information about each node included in the group table created in step S85 and the information about each node included in the group table created in step S86.

[Step S88] The management table output unit 133 displays the group tables created in steps S85 and S86 together with the asset table created in step S87 on the display device of the administrator terminal 102.

FIG. 24 is a diagram illustrating a fourth display example of group tables and an asset table. FIG. 24 illustrates a display example when steps S85 to S88 of FIG. 20 are executed. In FIG. 24, a group table 171d1 is an example of the group table created in step S85, a group table 171d2 is an example of the group table created in step S86, and an asset able 172d is an example of the asset table created in step S87.

In the example of FIG. 24, the node indicated by the IP address "7.7.7.7" is designated in step S61 of FIG. 19. As the main group (2), a group identified by a process name "ftp.exe", an execution interval "1 day", a representative address "1.1.1.1" and a date "20191211" is specified. The program corresponding to the communication process of the main group (2) has been uninstalled from the node indicated by the IP address "7.7.7.7" by the maintenance work. As a result, after the maintenance work, the group identified by the process name "sftp.exe", the execution interval "1 day", the representative address "1.1.1.1", and the date "20191212" is specified as the main group (1) for the node indicated by the IP address "7.7.7.7".

Information about the main group (1) is displayed in the group table 171d2. On the other hand, in the group table 171d1, information about the main group (2) is displayed together with the difference information. In the group table 171d1, a record R23 including the IP address "7.7.7.7" is displayed surrounded by a thick broken line to indicate that the record is difference information (deleted record). In the item of the difference of the record R23, character information indicating that the record R23 has been deleted (the communication process indicated by the record R23 has been deleted) is displayed.

In the asset table 172d, information about each node included in the group tables 171d1 and 171d2 is read from the management target device list 141 of the device list storage unit 140 and displayed.

In the example of FIG. 24, the group table 171d1 is displayed after the completion of the uninstallation work in the node indicated by the IP address "7.7.7.7", so that the administrator may easily confirm that the process corresponding to the uninstalled program does not operate in this node. For example, the administrator may easily and reliably confirm that the system operates as intended after the maintenance work.

According to the process by the node management apparatus 101 described above, when performing maintenance work on a certain node, the administrator may easily and reliably specify other nodes that may be greatly affected by the work by viewing the group table. When an abnormality occurs in a certain node, by viewing the group table for the group including the node, the administrator may specify another node for which the presence or absence of an abnormality is to be confirmed.

Since the difference information is displayed in the group table, the administrator may easily and reliably confirm a node that has been added or removed due to maintenance work and a node in which the process type to be executed has been changed. The administrator may obtain useful information for determining whether the system performs the intended operation after the maintenance work by viewing the group table including the difference information. The administrator may obtain useful information for investigating the cause of the failure after the maintenance work by viewing the group table including the difference information. By viewing the group table including the difference information, the administrator may be aware of the occurrence of an abnormality that may not be judged by appearance.

The process of FIGS. 19 and 20 may be modified as follows. For example, in step S63, the management table output unit 133 may specify a group similar to the main group (1) from the previous group instead of specifying the previous main group. For example, in the previous group, a group in which the process name, the execution interval, and the representative address are the same as those of the main group (1) and the number of duplicate nodes between the groups is the largest is specified as a group similar to the main group (1).

In FIGS. 19 and 20, the designation of a node is accepted, and the information related to the node is displayed, but for example, each of the current groups may be displayed while being switched to the administrator terminal 102. In this case, for example, the process of step S62 and subsequent steps is executed for each current group, in step S62, a group selected from the current groups is specified, and in step S63, a previous group similar to the group specified in step S62 is specified. By executing the process of step S62 and subsequent steps for each current group, a display screen including a group table and an asset table is created for each group, and any display screen is displayed on the administrator terminal 102 by the operation of the administrator.

Figure 25:
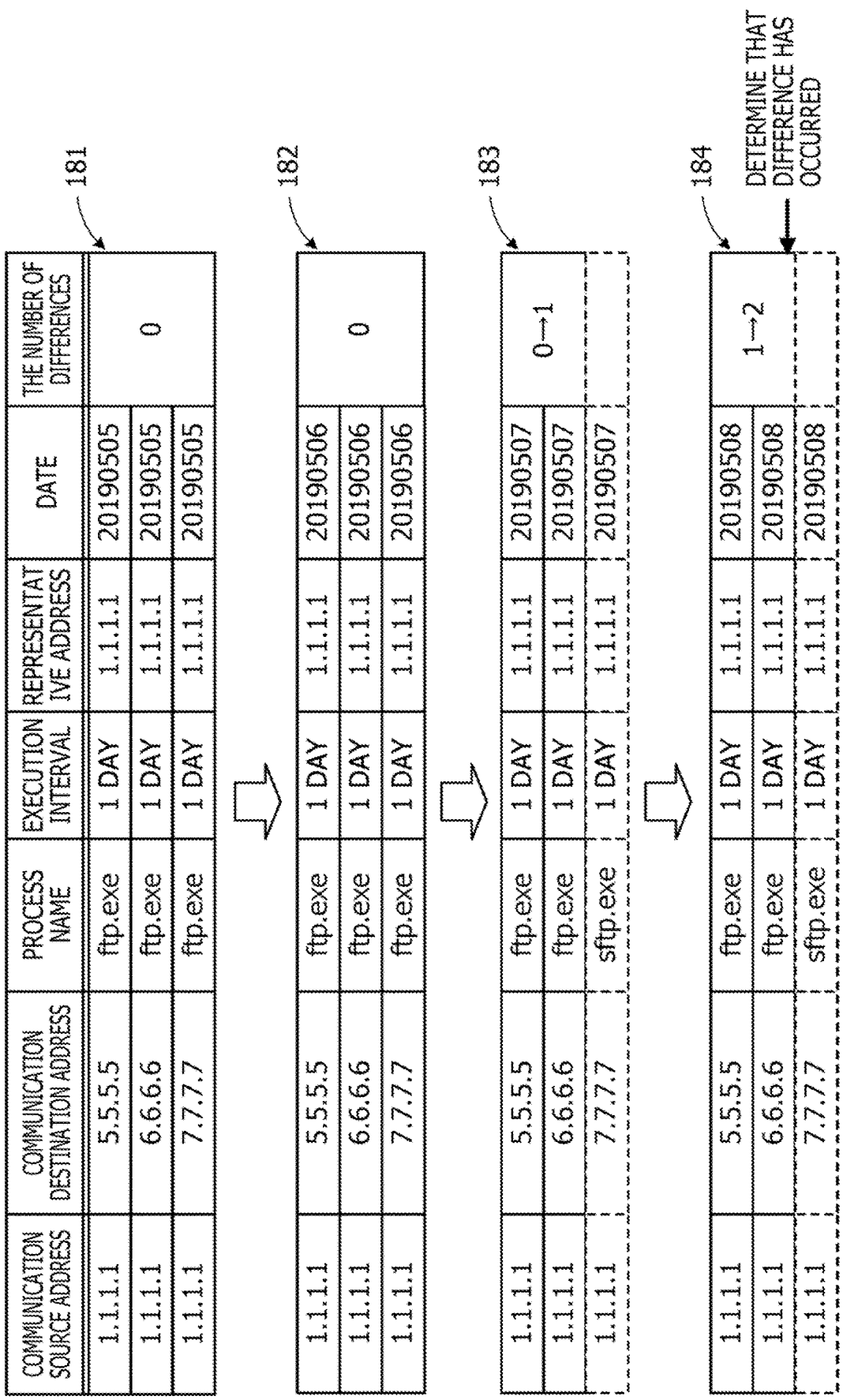
FIG. 25 is a diagram illustrating an example of a difference occurrence determination process using the number of differences.

As illustrated in FIG. 25 below, when the number of differences may be counted for each group and may reach a predetermined value of one or more, it may be determined that a difference has occurred in the group configuration, and the difference information may be displayed in the group table.

FIG. 25 is a diagram illustrating an example of a difference occurrence determination process using the number of differences. In the group data table 161, the number of differences is further registered for each group. The number of differences indicates how many times the data analysis process by the data analysis unit 132 has been executed since the content of the group has changed. When the number of differences reaches a predetermined determination threshold of one or more, it is determined that a difference has occurred in the group, and difference information is displayed in the group table. As an example, the determination threshold is set to 2.

A table 181 in FIG. 25 illustrates information of a certain group at the timing when the data analysis process is executed. This group is identified by a process name "ftp.exe", an execution interval "1 day", and a representative address "1.1.1.1". According to the table 181, the group includes nodes indicated by IP addresses "1.1.1.1", "5.5.5.5", "6.6.6.6", and "7.7.7.7". The number of differences is "0".

Next, a table 182 illustrates information of the certain group at a timing when the data analysis process is executed next. Since the content of the table 182 is the same as that of the table 181, the group indicated by the table 182 is the same as the group indicated by the table 181, and there is no change in the configuration of the group. Therefore, in this case, the number of differences in the table 182 remains "0".

Next, a table 183 illustrates information of the certain group at a timing when the data analysis process is executed after the next. However, the information of this group is displayed in an area surrounded by a solid line. This group is identified by a process name "ftp.exe", an execution interval "1 day", and a representative address "1.1.1.1", which is the same as the group indicated by the table 182. However, in the group indicated in the table 183, there is no record about the communication process between the node indicated by the IP address "7.7.7.7" and the node indicated by the IP address "1.1.1.1". Communication by a different process name "sftp.exe" is performed between these nodes. In this case, the number of differences of the group indicated in the table 183 is counted up to "1".

Next, a table 184 illustrates information of the certain group at a timing when the data analysis process is executed one more after the next. However, the information of this group is displayed in an area surrounded by a solid line. This group is identified by a process name "ftp.exe", an execution interval "1 day", and a representative address "1.1.1.1". Although the content of the table 184 is the same as that of the previous table 183, since the number of differences is "2", the content of the table 184 is compared with the content of the table 182 of the second previous time. Since there is a difference between these pieces of content, the number of differences of the group illustrated in the table 184 is counted up to "2".

In the example of FIG. 25, even when the data analysis process was performed two times after the difference occurred in the configuration of the group (after the communication process of the node of the IP address "7.7.7.7" was deleted), the configuration of the group remained changed and did not return to the original state. In this case, the management table output unit 133 determines that a difference has occurred in the group configuration, and displays the difference information about the node indicated by the IP address "7.7.7.7" in the group table indicating the information of the group indicated in the table 184. With such a process, it is possible to reliably detect that a difference has occurred in a group configuration and present information of the difference to the administrator.

Figure 26:
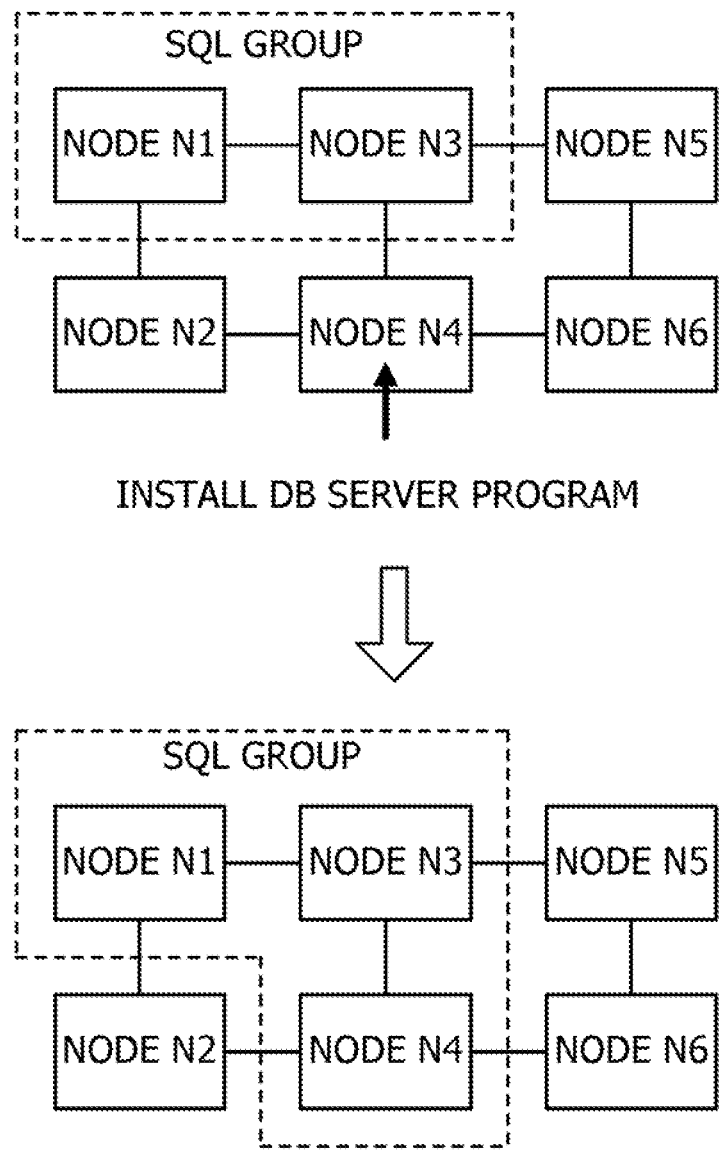
FIG. 26 is a diagram illustrating a first example of maintenance work.

Next, examples of maintenance work in a data center will be described with reference to FIGS. 26 to 28. In FIGS. 26 to 28, it is assumed that the nodes N1 to N6 are to be managed before maintenance work is performed.

FIG. 26 is a diagram illustrating a first example of maintenance work. In the example of FIG. 26, before the maintenance work is performed, the node N3 operates as a database server, and the node N1 operates as a client thereof. In this state, it is assumed that the maintenance work of installing a program for the database server in the node N4 is performed in order for the node N4 to operate as a database server in addition to the node N3.

Before the maintenance work is performed, as illustrated in the upper part of FIG. 26, the nodes N1 and N3 are included in the same group (referred to as an "SQL group"). Since the information of the SQL group is displayed by the process of the node management apparatus 101, the administrator may specify the nodes N1 and N3 as the nodes whose operation is to be stopped.

On the other hand, after the maintenance work is performed, as illustrated in the lower part of FIG. 26, the node N4 is included in the SQL group in addition to the nodes N1 and N3. When the grouping process is re-executed by the node management apparatus 101, the information of the SQL group including the nodes N1, N3, and N4 is displayed in the group table displayed by the process of the node management apparatus 101, and the information of the communication process in the node N4 is displayed as difference information. By viewing such a group table, the administrator may confirm that the node N4 operates correctly as intended.

FIG. 27 is a diagram illustrating a second example of maintenance work. In the example of FIG. 27, before the maintenance work is performed, the nodes N3 and N4 operate as Web servers, and the node N1 operates as a client thereof. In this state, it is assumed that maintenance work is performed to replace the Web server by replacing the node N4 with a node N7.

Before the maintenance work is performed, as illustrated in the upper part of FIG. 27, the nodes N1, N3, and N4 are included in the same group ("HyperText Transfer Protocol (HTTP) group"). Since the information of the HTTP group is displayed by the process of the node management apparatus 101, the administrator may specify the nodes N1, N3, and N4 as the nodes whose operation is to be stopped.

On the other hand, when the maintenance work is correctly performed, the nodes N1, N3, and N7 are included in the HTTP group. However, in the example of FIG. 27, it is assumed that a wrong program is installed in the node N7 and correct communication is not resumed between the node N7 and the node N1 which is the client. In this case, when the grouping process is re-executed by the node management apparatus 101, as illustrated in the lower part of FIG. 27, the information of the HTTP group including the nodes N1 and N3 is displayed in the group table displayed by the process of the node management apparatus 101, and the information of the communication process in the node N4 before the replacement is displayed as difference information. By viewing such a group table, the administrator may recognize that the node N4 has not been replaced correctly.

FIG. 28 is a diagram illustrating a third example of maintenance work. In the example of FIG. 28, before the maintenance work is performed, the nodes N3 and N4 operate as file servers, and the node N1 operates as a client thereof. In this state, it is assumed that maintenance work of uncoupling the node N4 and discarding one file server is performed.

Before the maintenance work is performed, the nodes N1, N3, and N4 are included in the same group (referred to as an "FTP group") as illustrated in the upper part of FIG. 28. Since the information of the FTP group is displayed by the process of the node management apparatus 101, the administrator may specify the nodes N1, N3, and N4 as the nodes whose operation is to be stopped.

On the other hand, after the maintenance work is performed, only the nodes N1 and N3 are included in the FTP group as illustrated in the lower part of FIG. 26. When the grouping process is re-executed by the node management apparatus 101, the information of the FTP group including the nodes N1 and N3 is displayed in the group table displayed by the process of the node management apparatus 101, and the information of the communication process in the node N4 is displayed as difference information. By viewing such a group table, the administrator may confirm that the node N4 is correctly discarded and the system operates correctly as intended.

The processing functions of the devices (for example, the management apparatus 1, the node management apparatus 101, and the nodes N1, N2, N3, N4, . . . ) described in each of the embodiments may be implemented by computers. In such a case, there is provided a program describing processing content of functions to be included in each apparatus, and the computer executes the program to implement the processing functions in the computer. The program describing the processing content may be recorded in a computer-readable recording medium. The computer-readable recording medium may be a magnetic storage device, an optical disc, a semiconductor memory, or the like. The magnetic storage device may be a hard disk drive (HDD), a magnetic tape, or the like. The optical disc may be a compact disc (CD), a digital versatile disc (DVD), a Blu-ray disc (BD, registered trademark), or the like.

In order to distribute the program, for example, portable recording medium, such as DVDs and CDs, on which the program is recorded are sold. The program may also be stored in a storage device of a server computer and be transferred from the server computer to other computers via a network.

The computer that executes the program, for example, stores the program recorded on the portable recording medium or the program transferred from the server computer in its own storage device. The computer reads the program from its own storage device and performs a process according to the program. The computer may also directly read the program from the portable recording medium and perform a process according to the program. The computer may also sequentially perform processes according to the received program each time the program is transferred from the server computer coupled to the computer via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus comprising:
a memory; and
a processor coupled to the memory and configured to:
execute a grouping process that includes a collection process configured to collect information from each of a plurality of devices based on a history of communication processes executed with another device of the plurality of devices and store the information in the memory;
execute a specification process configured to specify one or more pairs of a communication source device and a communication destination device in which communication processes of a same type were executed at a same time interval based on a process classification type indicating a type of a communication process between the communication source device and the communication destination device and a time interval in which the communication process is performed, which are included in the information collected in the collection process;
execute a creation process configured to create a group including the one or more pairs; and
output display information for displaying information of the devices included in the group created by the grouping process,
the processor executes the grouping process a plurality of times with the time interval,
in the output of the display information, when the grouping process is executed at a first timing, compares a first group created by the grouping process with a second group created by the grouping process executed at a second timing before the first timing, and
outputs, as the display information, the display information that indicates information of devices included in the first group and difference information for displaying a difference between the first group and the second group,
as the first group, of the groups created by the grouping process executed at the first timing, a group that includes a first device of the plurality of devices and includes most devices is selected, and
as the second group to be compared with the first group, of the groups created by the grouping process executed at the second timing, a group that includes the first device and includes the most devices is selected.

2. The management apparatus according to claim 1, wherein the difference information is information that indicates a device included only in one of the first group and the second group.

3. The management apparatus according to claim 1, wherein as the second group to be compared with the first group, of the groups created by the grouping process executed at the second timing, a group that has a same communication type and execution time interval as the first group, and includes a duplicate device included in the first group is selected.

4. The management apparatus according to claim 1, wherein
in each of the plurality of devices, based on the history, communication process information that indicates communication processes of a same type executed at a same time interval with a same communication partner is created, and
in the collection process, as information based on the history, the communication process information is collected from each of the plurality of devices.

5. The management apparatus according to claim 1, wherein in the grouping process, a pair of devices that have a same process name to be executed and a time interval at which communication processes are executed are grouped into the same group.

6. The management apparatus according to claim 1, wherein the display information includes information that indicates content of a communication process executed between the devices included in the group.

7. A management system comprising a plurality of devices and a management apparatus,
each of the plurality of devices accumulates a history of communication processes executed with another device of the plurality of devices in a memory, and based on the accumulated history, creates communication process information that indicates communication processes of a same type executed at a same time interval with a same communication partner, and
the management apparatus executes a grouping process that includes a collection process configured to collect the communication process information from each of the plurality of devices, a specification process configured to specify one or more pairs of a communication source device and a communication destination device in which communication processes of a same type were executed at a same time interval based on a process classification type indicating a type of a communication process between the communication source device and the communication destination device and a time interval in which the communication process is performed, which are included in the collected communication process information a creation process configured to create a group including the one or more pairs, and outputs display information for displaying information of the devices included in the group created by the grouping process,
the management apparatus executes the grouping process a plurality of times with the time interval,
in the output of the display information, when the grouping process is executed at a first timing, compares a first group created by the grouping process with a second group created by the grouping process executed at a second timing before the first timing, and
outputs, as the display information, the display information that indicates information of devices included in the first group and difference information for displaying a difference between the first group and the second group,
as the first group, of the groups created by the grouping process executed at the first timing, a group that includes a first device of the plurality of devices and includes most devices is selected, and
as the second group to be compared with the first group, of the groups created by the grouping process executed at the second timing, a group that includes the first device and includes the most devices is selected.

8. A management method causing a computer to execute a process, the process comprising:
executing a grouping process that includes a collection process configured to collect information from each of a plurality of devices based on a history of communication processes executed with another device of the plurality of devices, and store the information in a memory, a specification process configured to specify one or more pairs of a communication source device and a communication destination device in which communication processes of a same type were executed at a same time interval based on a process classification type indicating a type of a communication process between the communication source device and the communication destination device and a time interval in which the communication process is performed, which are included in the information collected in the collection process and a creation process configured to create a group including the one or more pairs; and outputting display information for displaying information of the devices included in the group created by the grouping process, the grouping process is executed a plurality of times with the time interval, in the output of the display information, when the grouping process is executed at a first timing, a first group created by the grouping process is compared with a second group created by the grouping process executed at a second timing before the first timing, and as the display information, the display information that indicates information of devices included in the first group and difference information for displaying a difference between the first group and the second group are output, as the first group, of the groups created by the grouping process executed at the first timing, a group that includes a first device of the plurality of devices and includes most devices is selected, and as the second group to be compared with the first group, of the groups created by the grouping process executed at the second timing, a group that includes the first device and includes the most devices is selected.

\* \* \* \* \*